(12) United States Patent
Tsai et al.

(10) Patent No.: US 8,717,685 B2
(45) Date of Patent: May 6, 2014

(54) OPTICAL IMAGE LENS SYSTEM

(75) Inventors: Tsung-Han Tsai, Taichung (TW); Ming-Ta Chou, Taichung (TW)

(73) Assignee: Largan Precision Co., Ltd, Taichung (TW)

( * ) Notice: Subject to any disclaimer, the term of this patent is extended or adjusted under 35 U.S.C. 154(b) by 122 days.

(21) Appl. No.: 13/597,862

(22) Filed: Aug. 29, 2012

(65) Prior Publication Data
US 2013/0329306 A1   Dec. 12, 2013

(30) Foreign Application Priority Data
Jun. 6, 2012  (TW) .............................. 101120253 A

(51) Int. Cl.
*G02B 3/02*   (2006.01)

(52) U.S. Cl.
USPC .......................................................... 359/739

(58) Field of Classification Search
USPC ................................. 359/713, 739
See application file for complete search history.

(56) References Cited

U.S. PATENT DOCUMENTS

| | | |
|---|---|---|
| 7,864,454 B1 | 1/2011 | Tang et al. |
| 8,514,501 B2 * | 8/2013 | Chen et al. .................... 359/714 |

* cited by examiner

*Primary Examiner* — James Jones
(74) *Attorney, Agent, or Firm* — Morris Manning & Martin, LLP; Tim Tingkang Xia, Esq.

(57) ABSTRACT

This invention provides an optical image lens system comprising: a positive first lens element having a convex object-side surface; a second lens element; a positive third lens element; a fourth lens element; a positive plastic fifth lens element having a convex object-side surface and a concave image-side surface, at least one of the object-side and image-side surfaces is aspheric; and a negative plastic sixth lens element having a concave image-side surface, at least one of the object-side and image-side surfaces is aspheric, wherein the shape of the image-side surface changes from concave at the paraxial region thereof to convex while away from the paraxial region thereof.

31 Claims, 21 Drawing Sheets

OPTICAL IMAGE LENS SYSTEM

BACKGROUND OF THE INVENTION

1. Field of the Invention

The present invention relates to an optical image lens system, and more particularly, to a compact optical image lens system used in electronic products and three-dimensional (3D) image applications thereof.

2. Description of the Prior Art

The demand for compact imaging lens assembly has grown in recent years as the popularity of portable electronic products with the photographing function has increased. The sensor of a general photographing camera is none other than CCD (Charge Coupled Device) or CMOS (Complementary Metal Oxide Semiconductor Sensor). Furthermore, as advanced semiconductor manufacturing technology has allowed the pixel size of sensors to be reduced, and the current electronic products are leaning toward a trend of being more compact, there is an increasing demand for compact imaging lens assembly featuring better image quality.

A conventional compact imaging lens system with high image quality equipped on a portable electronic product is often composed of five lens elements such as the lens system set forth in U.S. Pat. No. 7,864,454. However, with the popularity of high level portable electronic products, such as smart phone and PDA (Personal Digital Assistant), the demand for higher image quality of compact imaging lens system increases significantly, and the conventional lens system with five lens elements can no longer satisfy the imaging lens systems of even higher level.

Inasmuch as the foregoing, a need exists in the art for a lens system with good image quality and is applicable to compact portable electronic products.

SUMMARY OF THE INVENTION

The present invention provides an optical image lens system comprising, in order from an object side to an image side: a first lens element with positive refractive power having a convex object-side surface; a second lens element; a third lens element with positive refractive power; a fourth lens element; a fifth lens element with positive refractive power having a convex object-side surface and concave image-side surface, at least one of an object-side surface and the image-side surface thereof being aspheric, and the fifth lens element is made of plastic; and a sixth lens element with negative refractive power having a concave image-side surface, at least one of an object-side surface and the image-side surface thereof being aspheric, the sixth lens element is made of plastic, and the shape of the image-side surface changes from concave at the paraxial region thereof to convex while away from the paraxial region thereof; wherein a focal length of the third lens element is f3, a focal length of the first lens element is f1, a focal length of the fifth lens element is f5, and they satisfy the following relation: $0<f3/f1<2.5$; and $0<f5/f3<4.0$.

On the other hand, the present invention provides an optical image lens system comprising, in order from an object side to an image side: a first lens element with positive refractive power having a convex object-side surface; a second lens element; a third lens element with positive refractive power; a fourth lens element having a concave object-side surface and a convex image-side surface; a fifth lens element with positive refractive power having a convex object-side surface and a concave image-side surface, at least one of an object-side surface and the image-side surface thereof being aspheric, and the fifth lens element is made of plastic; and a sixth lens element with negative refractive power having a concave image-side surface, at least one of an object-side surface and the image-side surface thereof being aspheric, the sixth lens element is made of plastic, and the shape of the image-side surface changes from concave at the paraxial region thereof to convex while away from the paraxial region thereof; wherein a focal length of the third lens element is f3, a focal length of the first lens element is f1, and they satisfy the following relation: $0<f3/f1<2.5$.

Furthermore, the present invention provides an optical image lens system comprising, in order from an object side to an image side: a first lens element with positive refractive power having a convex object-side surface; a second lens element; a third lens element with positive refractive power; a fourth lens element; a fifth lens element with positive refractive power having a convex object-side surface and concave image-side surface, at least one of an object-side surface and the image-side surface thereof being aspheric, and the fifth lens element is made of plastic; and a sixth lens element with negative refractive power having a concave image-side surface, at least one of an object-side surface and the image-side surface thereof being aspheric, the sixth lens element is made of plastic, and the shape of the image-side surface changes from concave at the paraxial region thereof to convex while away from the paraxial region thereof; wherein a focal length of the fifth lens element is f5, a focal length of the third lens element is f3, a focal length of the fourth lens element is f4, and they satisfy the following relation: $0<f5/f3<4.0$; and $-1.5<f/f4<-0.5$.

By such arrangement, the optical image lens system of the present invention has positive refractive power that is distributed more balanced not only for suppressing the field curvature effectively but also for correcting spherical aberrations, reducing system sensitivity, and thereby improving image quality thereof.

In the aforementioned optical image lens system, it can be more balanced to distribute the positive refractive power of the system, avoid overloading the positive refractive power on one single lens and suppress the field curvature effectively, if the first, the third, and the fifth lens element are all with positive refractive power. By such arrangement, the spherical aberration is corrected favorably, the system sensitivity in power distribution is reduced, and thereby the image quality is improved at the same time. The fourth lens element has negative refractive power, and thereby the aberration of the system can be favorably corrected. When the sixth lens element has negative refractive power, the principal point of the system can be positioned away from the image plane so that the total track length thereof can be shortened for keeping the system compact.

In the aforementioned optical image lens system, the first lens element can be a bi-convex lens element or a meniscus lens element having a convex object-side surface and a concave image-side surface. When the first lens element is a bi-convex lens element, the refractive power of the first lens element can be strengthened for reducing the total track length of the system. When the first lens element is a convex-concave meniscus lens element, it is favorable for correcting the spherical aberration of the system. When the fourth lens element is a concave-convex meniscus lens element, the astigmatism of the system can be corrected effectively. When the fifth lens element is a convex-concave meniscus lens element, the astigmatic aberration of the system can be corrected effectively. In addition, when the shape of the object-side surface on the fifth lens element changes from convex at the paraxial region thereof to concave while away from the paraxial region thereof, the angle at which light projects onto the image sensor from the off-axis field can be effectively reduced so that the sensing efficiency of the image sensor can be improved and the off-axis aberration can be further corrected.

Likewise, when the shape of the object-side surface on the sixth lens element changes from concave at the paraxial region thereof to convex while away from the paraxial region thereof, the angle at which light projects onto the image sensor from the off-axis field can be effectively reduced so that the sensing efficiency of the image sensor can be improved and the off-axis aberration can be further corrected.

DETAILED DESCRIPTION OF THE PREFERRED EMBODIMENTS

Figure 1A:
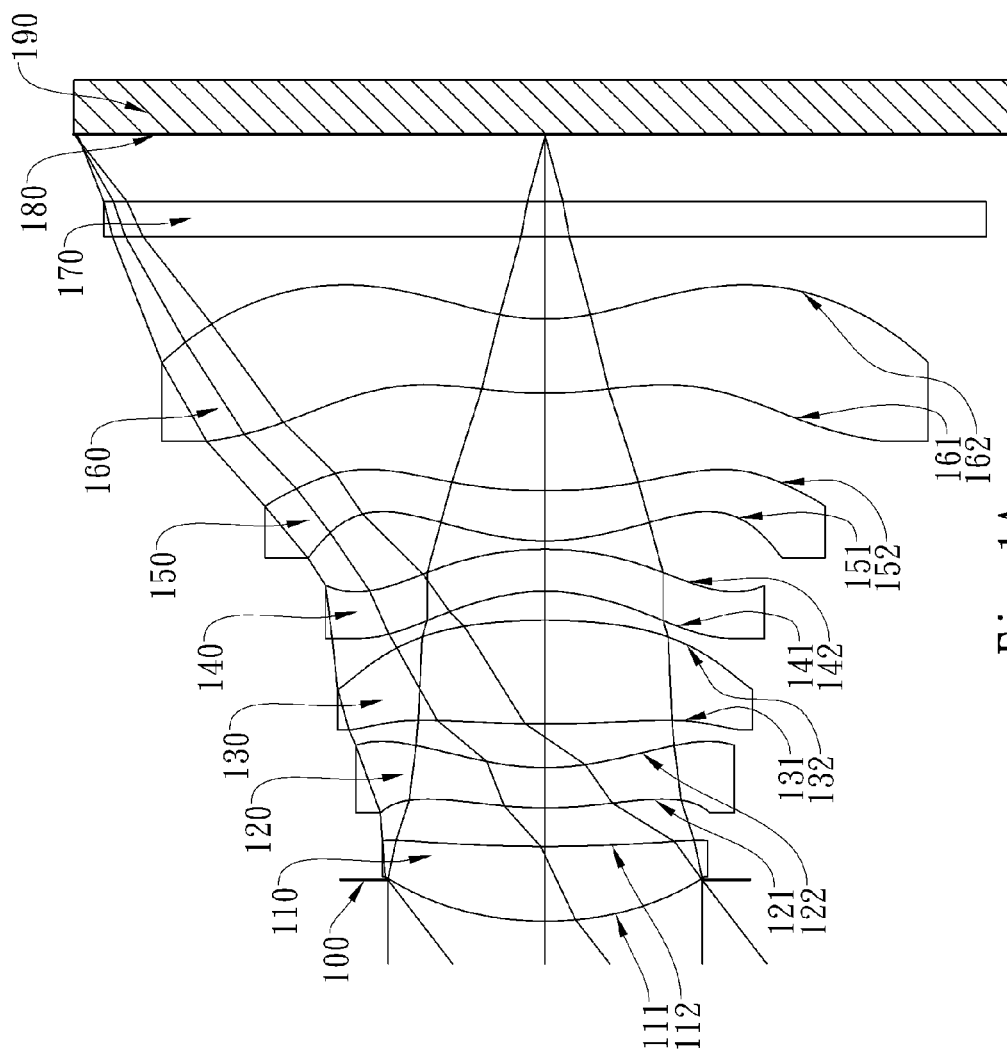
FIG. 1A shows an optical image lens system in accordance with the first embodiment of the present invention.

The present invention provides an optical image lens system comprising, in order from an object side to an image side: a first lens element with positive refractive power having a convex object-side surface; a second lens element; a third lens element with positive refractive power; a fourth lens element; a fifth lens element with positive refractive power having a convex object-side surface and concave image-side surface, at least one of an object-side surface and the image-side surface thereof being aspheric, and the fifth lens element is made of plastic; and a sixth lens element with negative refractive power having a concave image-side surface, at least one of an object-side surface and the image-side surface thereof being aspheric, the sixth lens element is made of plastic, and the shape of the image-side surface changes from concave at the paraxial region thereof to convex while away from the paraxial region thereof; wherein a focal length of the third lens element is f3, a focal length of the first lens element is f1, a focal length of the fifth lens element is f5, and they satisfy the following relation: $0<f3/f1<2.5$; and $0<f5/f3<4.0$.

When the relation of $0<f3/f1<2.5$ is satisfied, the positive refractive power of the first and the third lens element can be favorably distributed, and thereby the spherical aberration can be effectively corrected and the sensitivity of the system can be reduced; preferably, the following relation is satisfied: $0.3<f3/f1<1.6$.

When the relation of $0<f5/f3<4.0$ is satisfied, the positive refractive power of the third and the fifth lens element can be favorably distributed, and thereby the field curvature can be effectively suppressed and the sensitivity of the system can be reduced; preferably, the following relation is satisfied: $0.4<f5/f3<1.6$.

In the aforementioned optical image lens system, a curvature radius of the object-side surface of the fifth lens element is R9, a curvature radius of the image-side surface of the fifth lens element is R10, and they preferably satisfy the following relation: $-5.0<(R9+R10)/(R9-R10)<-1.3$. When the above relation is satisfied, the curvature of the fifth lens element is more suitable, and thereby the astigmatism of the system is favorably corrected.

In the aforementioned optical image lens system, a focal length of the optical image lens system is f, a focal length of the fourth lens element is f4, and they preferably satisfy the following relation: $-1.5<f/f4<-0.5$. When the above relation is satisfied, it is favorable for correcting the high order aberrations of the optical system.

In the aforementioned optical image lens system, the central thickness of the fourth lens element on the optical axis is CT4, the central thickness of the third lens element on the optical axis is CT3, and preferably, they satisfy the following relation: $0<CT4/CT3<1.2$. When this relation is satisfied, the lens elements are arranged more appropriately in the system, which provides favorable moldability and homogeneity for plastic lens elements during the injection molding process and achieves superior image quality.

In the aforementioned optical image lens system, an Abbe number of the fourth lens element is V4, an Abbe number of the fifth lens element is V5, and they preferably satisfy the following relation: $0.2<V4/V5<0.6$. When the above relation is satisfied, the chromatic aberration of the assembly can be favorably corrected.

In the aforementioned optical image lens system, a focal length of the optical image lens system is f, a focal length of the second lens element is f2, and they preferably satisfy the following relation: $-0.7<f/f2<0$. When the above relation is satisfied, it is favorable for correcting the aberrations of the system.

In the aforementioned optical image lens system, the maximal field of view of the optical image lens system is FOV, and preferably, when it satisfies the following relation: 70 degrees<FOV<100 degrees, the angle of view of the optical image lens system is more suitable.

In the aforementioned optical image lens system, an axial distance between the fifth lens element and the sixth lens element is T56, and preferably, when T56 has the largest axial distance among any two adjacent lens elements with refractive power, it is favorable for correcting the field curvature.

In the aforementioned optical image lens assembly, the distance in parallel with the optical axis from the maximum effective diameter position on the object-side surface of the fifth lens element to the on-axis vertex on the object-side surface of the fifth lens element is SAG51. When the maximum effective diameter position is closer to the object side than the on-axis vertex, SAG51 has a positive value; and when the maximum effective diameter position is closer to the image side than the on-axis vertex, SAG51 has a negative value. The central thickness of the fifth lens element is CT5; preferably, and they satisfy the following relations: $-1.0<SAG51/CT5<0$ which ensures the shape of the fifth lens element is not excessively curved. In addition, this not only facilitates the molding production of the lens element but also helps to reduce the space required to assemble and arrange the lenses in the lens assembly, thus resulting in a more compact lens system.

On the other hand, the present invention provides an optical image lens system comprising, in order from an object side to an image side: a first lens element with positive refractive power having a convex object-side surface; a second lens element; a third lens element with positive refractive power; a fourth lens element having a concave object-side surface and a convex image-side surface; a fifth lens element with positive refractive power having a convex object-side surface and a concave image-side surface, at least one of an object-side surface and the image-side surface thereof being aspheric, and the fifth lens element is made of plastic; and a sixth lens element with negative refractive power having a concave image-side surface, at least one of an object-side surface and the image-side surface thereof being aspheric, the sixth lens element is made of plastic, and the shape of the image-side surface changes from concave at the paraxial region thereof to convex while away from the paraxial region thereof; wherein a focal length of the third lens element is f3, a focal length of the first lens element is f1, and they satisfy the following relation: $0<f3/f1<2.5$.

When the relation of $0<f3/f1<2.5$ is satisfied, the positive refractive power of the first and the third lens element can be favorably distributed, and thereby the spherical aberration can be effectively corrected and the sensitivity of the system can be reduced; preferably, the following relation is satisfied: $0.3<f3/f1<1.6$.

In the aforementioned optical image lens system, a curvature radius of the object-side surface of the fifth lens element is R9, a curvature radius of the image-side surface of the fifth lens element is R10, and they preferably satisfy the following relation: $-5.0<(R9+R10)/(R9-R10)<-1.3$. When the above relation is satisfied, the curvature of the fifth lens element is more suitable, and thereby the astigmatism of the system is favorably corrected.

In the aforementioned optical image lens system, an Abbe number of the fourth lens element is V4, an Abbe number of the fifth lens element is V5, and they preferably satisfy the following relation: $0.2<V4/V5<0.6$. When the above relation is satisfied, the chromatic aberration of the system can be favorably corrected.

When the relation of $0<f5/f3<4.0$ is satisfied, the positive refractive power of the third and the fifth lens element can be favorably distributed, and thereby the field curvature can be effectively suppressed and the sensitivity of the system can be reduced.

In the aforementioned optical image lens system, the central thickness of the fourth lens element on the optical axis is CT4, the central thickness of the third lens element on the optical axis is CT3, and preferably, they satisfy the following relation: $0<CT4/CT3<1.2$. When this relation is satisfied, the lens elements are arranged more appropriately in the lens system, which provides favorable moldability and homogeneity for plastic lens elements during the injection molding process and achieves superior image quality.

In the aforementioned optical image lens system, a focal length of the optical image lens system is f, a focal length of the fourth lens element is f4, and they preferably satisfy the following relation: $-1.5<f/f4<-0.5$. When the above relation is satisfied, it is favorable for correcting the high order aberrations of the optical system.

In the aforementioned optical image lens assembly, the distance in parallel with the optical axis from the maximum effective diameter position on the object-side surface of the fifth lens element to the on-axis vertex on the object-side surface of the fifth lens element is SAG51. When the maximum effective diameter position is closer to the object side than the on-axis vertex, SAG51 has a positive value; and when the maximum effective diameter position is closer to the image side than the on-axis vertex, SAG51 has a negative value. The central thickness of the fifth lens element is CT5; preferably, and they satisfy the following relations: $-1.0<SAG51/CT5<0$ which ensures that the shape of the fifth lens element is not excessively curved and its thickness is more favorable. In addition, this not only facilitates the production and shaping of the lens element but also helps to reduce the space required to assemble and arrange the lenses in the lens assembly, thus resulting in a more compact arrangement of the lens system.

Furthermore, the present invention provides an optical image lens system comprising, in order from an object side to an image side: a first lens element with positive refractive power having a convex object-side surface; a second lens element; a third lens element with positive refractive power; a fourth lens element; a fifth lens element with positive refractive power having a convex object-side surface and concave image-side surface, at least one of an object-side surface and the image-side surface thereof being aspheric, and the fifth lens element is made of plastic; and a sixth lens element with negative refractive power having a concave image-side surface, at least one of an object-side surface and the image-side surface thereof being aspheric, the sixth lens element is made of plastic, and the shape of the image-side surface changes from concave at the paraxial region thereof to convex while away from the paraxial region thereof; wherein a focal length of the fifth lens element is f5, a focal length of the third lens element is f3, a focal length of the fourth lens element is f4, and they satisfy the following relation: $0<f5/f3<4.0$; and $-1.5<f/f4<-0.5$.

When the relation of $0<f5/f3<4.0$ is satisfied, the positive refractive power of the third and the fifth lens element can be favorably distributed, and thereby the field curvature can be effectively suppressed and the sensitivity of the system can be reduced; preferably, the following relation is satisfied: $0.4<f5/f3<1.6$.

In the aforementioned optical image lens system, a focal length of the optical image lens system is f, a focal length of the fourth lens element is f4, and they preferably satisfy the following relation: $-1.5<f/f4<-0.5$. When the above relation is satisfied, it is favorable for correcting the high order aberrations of the optical system.

When the relation of $0<f3/f1<2.5$ is satisfied, the positive refractive power of the first and the third lens element can be favorably distributed, and thereby the spherical aberration can be effectively corrected and the sensitivity of the system can be reduced.

In the aforementioned optical image lens system, an Abbe number of the fourth lens element is V4, an Abbe number of the fifth lens element is V5, and they preferably satisfy the following relation: 0.2<V4/V5<0.6. When the above relation is satisfied, the chromatic aberration of the system can be favorably corrected.

In the aforementioned optical image lens system, the central thickness of the fourth lens element on the optical axis is CT4, the central thickness of the third lens element on the optical axis is CT3, and preferably, they satisfy the following relation: 0<CT4/CT3<1.2. When this relation is satisfied, the lens elements are arranged more appropriately in the lens system, which provides favorable moldability and homogeneity for plastic lens elements during the injection molding process and achieves superior image quality.

In the aforementioned optical image lens system, the lens elements can be made of glass or plastic material. If the lens elements are made of glass, the freedom for distributing the refractive power of the optical image lens system can be increased. If plastic material is adopted to produce the lens elements, the production cost will be reduced effectively. Additionally, the surfaces of the lens elements can be aspheric and easily made into non-spherical profiles, allowing more design parameter freedom which can be used to reduce aberrations and the number of the lens elements used in an optical system. Consequently, the total track length of the optical image lens system can be effectively reduced.

In the present optical image lens system, there can be at least one stop provided, such as an aperture stop, a glare stop, or a field stop. Said glare stop or said field stop is for eliminating the stray light and thereby improving the image resolution thereof.

In the present optical image lens system, the aperture stop can be configured as a front stop or a middle stop. A front stop can provide a longer distance between an exit pupil of the system and an image plane which improves the image-sensing efficiency of an image sensor of CCD or CMOS. A middle stop is favorable for enlarging the field of view of the system and thereby provides a wider field of view for the same.

Figure 11:
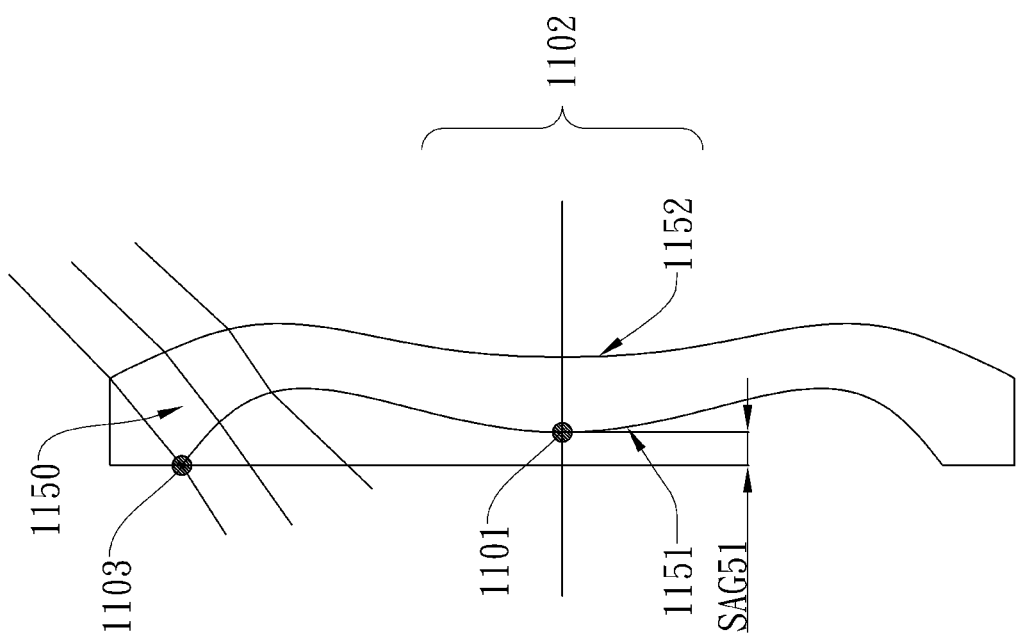
FIG. 11 shows the distance and relative position represented by SAG51 as well as the changes of curvature on each of the object-side and image-side surface of the fifth lens element.

The distance in parallel with the optical axis from the maximum effective diameter position on the object-side surface 1151 of the fifth lens element 1150 to the on-axis vertex 1101 on the object-side surface of the fifth lens element is SAG51 as illustrated in FIG. 11.

In the present optical image lens system, if a lens element is described to have a convex surface, it means the portion of the surface in proximity to the optical axis is convex; if a lens element is described to have a concave surface, it means the portion of the surface in proximity to the optical axis is concave.

"Paraxial region" 1102 refers to the central region in proximity to the optical axis of a lens element as also illustrated in FIG. 11. The object-side surface 1151 of the fifth lens element 1150 is convex at the paraxial region 1102, and the shape of the object-side surface 1151 changes from convex at the paraxial region 1102 thereof to concave while away from the paraxial region 1102 thereof; and the image-side surface 1152 of the fifth lens element 1150 is concave at the paraxial region 1102, and the shape of the image-side surface 1152 changes from concave at the paraxial region 1102 thereof to convex while away from the paraxial region 1102 thereof. Accordingly, the features of the sixth lens element is comprehensible, when the shape of the image-side surface on the sixth lens element changes from concave at the paraxial region thereof to convex while away from the paraxial region thereof.

Preferred embodiments of the present invention will be described in the following paragraphs by referring to the accompanying drawings.

Embodiment 1

Figure 1B:
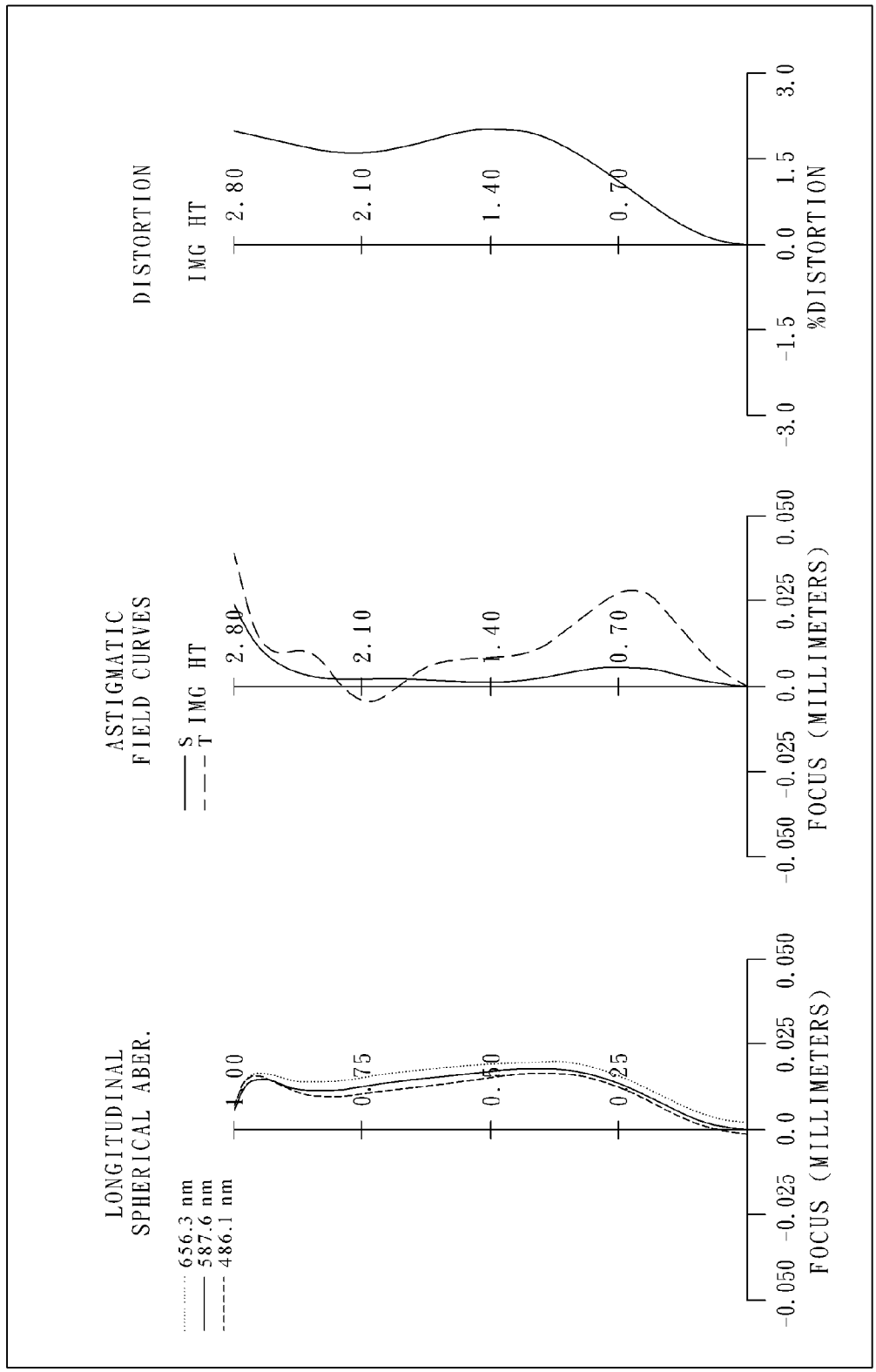
FIG. 1B shows the aberration curves of the first embodiment of the present invention.

FIG. 1A shows an optical image lens system in accordance with the first embodiment of the present invention, and FIG. 1B shows the aberration curves of the first embodiment of the present invention. The optical image lens system of the first embodiment of the present invention mainly comprises six lens elements with refractive power, in order from an object side to an image side:

a plastic first lens element 110 with positive refractive power having a convex object-side surface 111 and a concave image-side surface 112, the object-side and image-side surfaces 111 and 112 thereof being aspheric;

a plastic second lens element 120 with negative refractive power having a convex object-side surface 121 and a concave image-side surface 122, the object-side and image-side surfaces 121 and 122 thereof being aspheric;

a plastic third lens element 130 with positive refractive power having a convex object-side surface 131 and a convex image-side surface 132, the object-side and image-side surfaces 131 and 132 thereof being aspheric;

a plastic fourth lens element 140 with negative refractive power having a concave object-side surface 141 and a convex image-side surface 142, the object-side and image-side surfaces 141 and 142 thereof being aspheric;

a plastic fifth lens element 150 with positive refractive power having a convex object-side surface 151 and a concave image-side surface 152, the object-side and image-side surfaces 151 and 152 thereof being aspheric, and the object-side surface 151 of the fifth lens element 150 is convex at the paraxial region, and the shape of the object-side surface 151 changes from convex at the paraxial region thereof to concave while away from the paraxial region thereof; and the image-side surface 152 of the fifth lens element 150 is concave at the paraxial region, and the shape of the image-side surface 152 changes from concave at the paraxial region thereof to convex while away from the paraxial region thereof; and a plastic sixth lens element 160 with negative refractive power having a convex object-side surface 161 and a concave image-side surface 162, the object-side and image-side surfaces 161 and 162 thereof being aspheric, and the image-side surface 162 of the sixth lens element 160 is concave at the paraxial region, and the shape of the image-side surface 162 changes from concave at the paraxial region thereof to convex while away from the paraxial region thereof;

wherein an aperture stop 100 is disposed between an object and the first lens element 110; the optical image lens system further comprises an IR filter 170 disposed between the image-side surface 162 of the sixth lens element 160 and an image plane 180, and the IR filter 170 is made of glass and has no influence on the focal length of the optical image lens system; the optical image lens system further comprises an image sensor 190 provided on the image plane 180.

The detailed optical data of the first embodiment is shown in TABLE 1, and the aspheric surface data is shown in TABLE 2, wherein the units of the curvature radius, the thickness and the focal length are expressed in mm, and HFOV is defined as half of the maximal field of view.

(Embodiment 1)
f = 3.56 mm, Fno = 1.90, HFOV = 37.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.246 | | | | |
| 2 | Lens 1 | 1.949 | ASP | 0.446 | Plastic | 1.544 | 55.9 | 4.64 |
| 3 | | 7.862 | ASP | 0.230 | | | | |
| 4 | Lens 2 | 2.226 | ASP | 0.240 | Plastic | 1.640 | 23.3 | −7.81 |
| 5 | | 1.475 | ASP | 0.261 | | | | |
| 6 | Lens 3 | 7.009 | ASP | 0.618 | Plastic | 1.544 | 55.9 | 4.49 |
| 7 | | −3.634 | ASP | 0.173 | | | | |
| 8 | Lens 4 | −1.098 | ASP | 0.250 | Plastic | 1.640 | 23.3 | −4.63 |
| 9 | | −1.900 | ASP | 0.050 | | | | |
| 10 | Lens 5 | 1.338 | ASP | 0.300 | Plastic | 1.544 | 55.9 | 3.69 |
| 11 | | 3.688 | ASP | 0.580 | | | | |
| 12 | Lens 6 | 2.241 | ASP | 0.442 | Plastic | 1.544 | 55.9 | −5.96 |
| 13 | | 1.233 | ASP | 0.492 | | | | |
| 14 | IR-filter | Plano | | 0.210 | Glass | 1.517 | 64.2 | — |
| 15 | | Plano | | 0.401 | | | | |
| 16 | Image | Plano | | — | | | | |

Note:
Reference Wavelength is 587.6 nm (d-line).

TABLE 2

Aspheric Coefficients

| Surface # | 2 | 3 | 4 | 5 | 6 | 7 |
|---|---|---|---|---|---|---|
| k = | −2.1079E−01 | −2.0037E+01 | −1.8924E+01 | −7.1419E+00 | −2.3330E+01 | −3.0000E+01 |
| A4 = | 1.1451E−02 | −4.9813E−02 | −1.1623E−01 | −4.5882E−02 | −4.3962E−02 | −1.1995E−01 |
| A6 = | 2.5687E−02 | 1.1639E−01 | −1.8990E−02 | −3.9525E−02 | 1.0225E−02 | −5.4695E−02 |
| A8 = | −3.4983E−02 | −1.7157E−01 | −2.1990E−02 | 6.7960E−02 | −4.2057E−02 | 2.2178E−02 |
| A10 = | 5.7943E−02 | 1.7570E−01 | 8.0253E−02 | −5.4911E−02 | −4.0466E−02 | 7.0465E−02 |
| A12 = | −3.2893E−02 | −1.0031E−01 | −1.1313E−01 | −2.2726E−02 | 5.8692E−02 | −7.9291E−02 |
| A14 = | | | | 2.1569E−02 | −1.2196E−02 | 2.5661E−02 |

| Surface # | 8 | 9 | 10 | 11 | 12 | 13 |
|---|---|---|---|---|---|---|
| k = | −6.5178E+00 | −6.1771E−01 | −9.3057E+00 | 1.8663E+00 | −1.0500E+01 | −3.4600E+00 |
| A4 = | −4.1008E−02 | −6.0885E−02 | 7.8826E−02 | 1.7557E−01 | −1.9002E−01 | −1.8222E−01 |
| A6 = | −2.7085E−01 | −1.7442E−02 | −1.9025E−01 | −3.8131E−01 | 3.5324E−02 | 9.7623E−02 |
| A8 = | 7.3790E−01 | 2.6993E−01 | 9.2275E−02 | 3.0878E−01 | 1.8523E−02 | −4.2574E−02 |
| A10 = | −6.4881E−01 | −2.3770E−01 | −3.0406E−02 | −1.7157E−01 | −1.0336E−02 | 1.2934E−02 |
| A12 = | 2.6964E−01 | 9.1232E−02 | −9.2850E−04 | 6.0698E−02 | 2.2036E−03 | −2.4524E−03 |
| A14 = | −4.6606E−02 | −1.3824E−02 | 2.3757E−03 | −1.1501E−02 | −2.3069E−04 | 2.5592E−04 |
| A16 = | | | | 8.6055E−04 | 9.7129E−06 | −1.1161E−05 |

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

wherein:

X: the relative distance between a point on the aspheric surface at a distance Y from the optical axis and the tangential plane at the aspheric surface vertex;

Y: the distance from the point on the curve of the aspheric surface to the optical axis;

R: curvature radius;

k: the conic coefficient;

Ai: the aspheric coefficient of order i.

In the first embodiment of the present optical image lens system, the focal length of the optical image lens system is f, and it satisfies the relation: f=3.56 (mm).

In the first embodiment of the present optical image lens system, the f-number of the optical image lens system is Fno, and it satisfies the relation: Fno=1.90.

In the first embodiment of the present optical image lens system, half of the maximal field of view of the optical image lens system is HFOV, and it satisfies the relation: HFOV=37.6 deg.

In the first embodiment of the present optical image lens system, an Abbe number of the fourth lens element 140 is V4, an Abbe number of the fifth lens element 150 is V5, and they satisfy the relation: V4/V5=0.42.

In the first embodiment of the present optical image lens system, a central thickness of the fourth lens element 140 on the optical axis is CT4, a central thickness of the third lens element 130 on the optical axis is CT3, and they satisfy the relation: CT4/CT3=0.40.

In the first embodiment of the present optical image lens system, the curvature radius of the object-side surface 151 of the fifth lens element 150 is R9, the curvature radius of the image-side surface 152 of the fifth lens element 150 is R10, and they satisfy the following relation: (R9+R10)/(R9−R10) <−2.14.

In the first embodiment of the present optical image lens system, a focal length of the optical image lens system is f, a focal length of the second lens element 120 is f2, and they satisfy the relation: f/f2=−0.46.

In the first embodiment of the present optical image lens system, a focal length of the optical image lens system is f, a focal length of the fourth lens element 140 is f4, and they satisfy the relation: f/f4=−0.77.

In the first embodiment of the present optical image lens system, a focal length of the third lens element 130 is f3, a focal length of the first lens element 110 is f1, and they satisfy the relation: f3/f1=0.97.

In the first embodiment of the present optical image lens system, a focal length of the fifth lens element 150 is f5, a focal length of the third lens element 130 is f3, and they satisfy the relation: f5/f3=0.82.

In the first embodiment of the present optical image lens system, a maximal field of view of the optical image lens system is FOV, and it satisfies the relation: FOV=75.2 deg.

In the first embodiment of the present optical image lens system, the distance in parallel with the optical axis from the maximum effective diameter position on the object-side surface 151 of the fifth lens element 150 to the on-axis vertex on the object-side surface 151 of the fifth lens element is SAG51, a central thickness of the fifth lens element 150 on the optical axis is CT5, and they satisfy the relation: SAG51/CT5=−0.34.

Embodiment 2

Figure 2A:
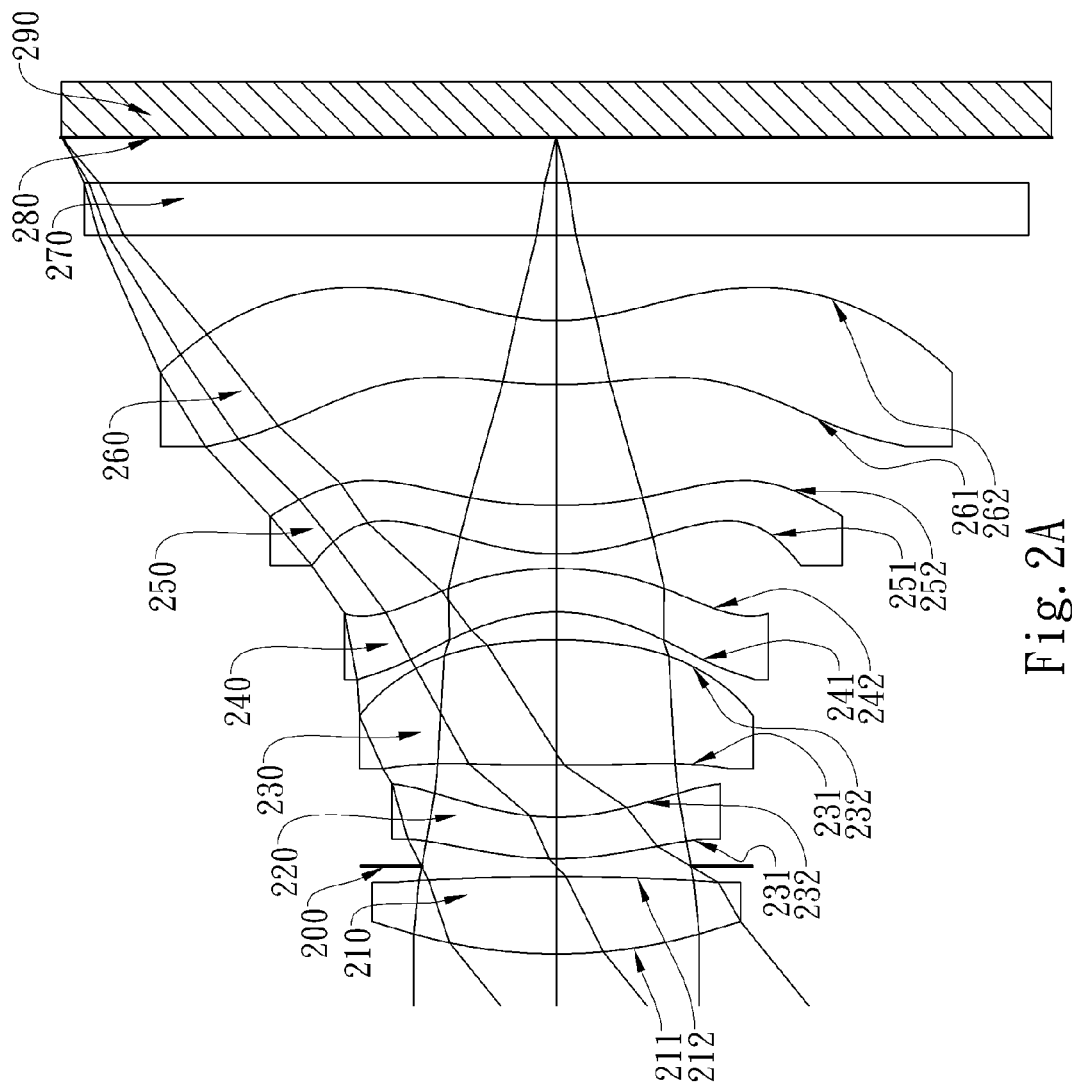
FIG. 2A shows an optical image lens system in accordance with the second embodiment of the present invention.
Figure 2B:
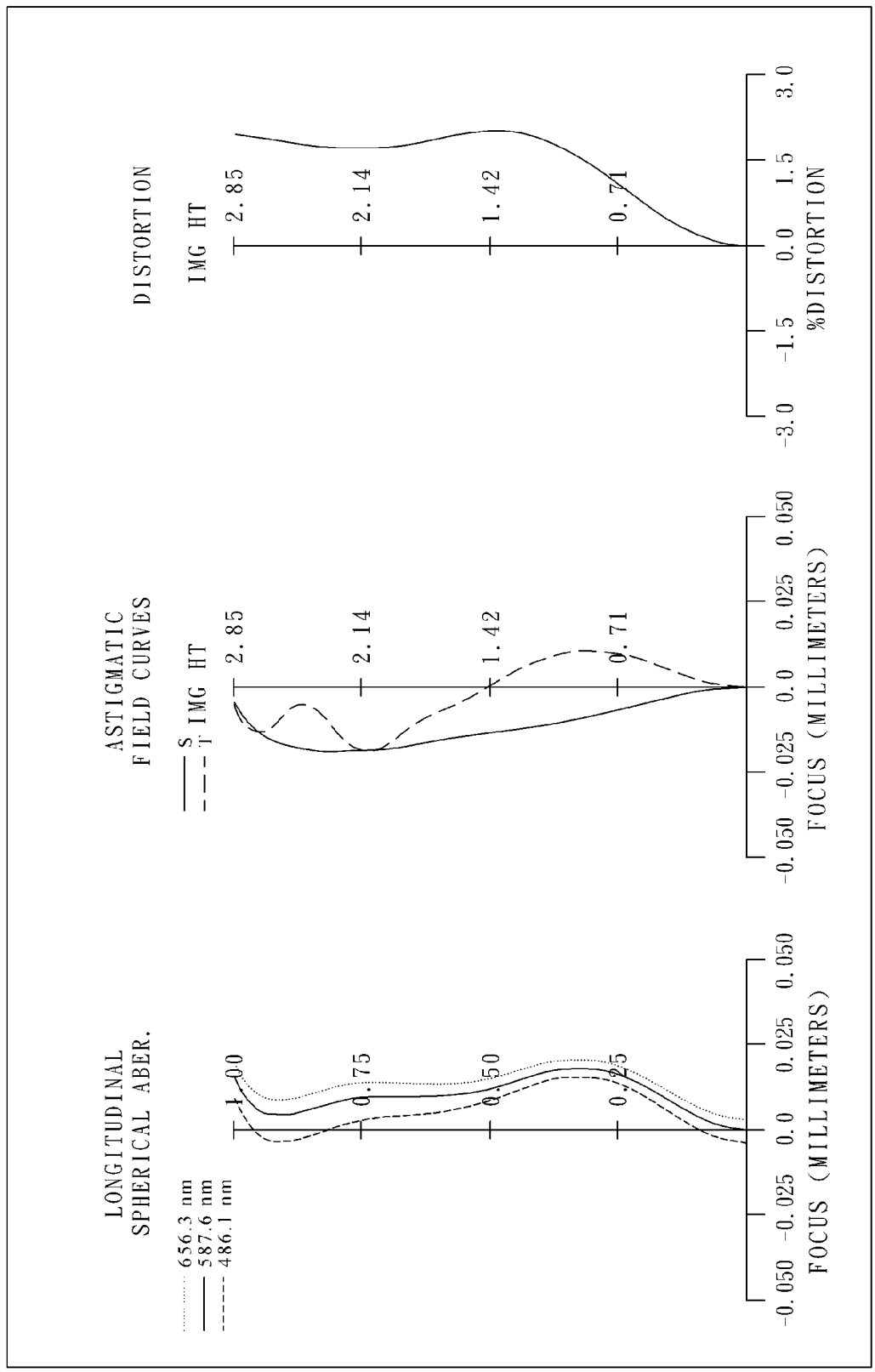
FIG. 2B shows the aberration curves of the second embodiment of the present invention.

FIG. 2A shows an optical image lens system in accordance with the second embodiment of the present invention, and FIG. 2B shows the aberration curves of the second embodiment of the present invention. The optical image lens system of the second embodiment of the present invention mainly comprises six lens elements with refractive power, in order from an object side to an image side:

a plastic first lens element 210 with positive refractive power having a convex object-side surface 211 and a convex image-side surface 212, the object-side and image-side surfaces 211 and 212 thereof being aspheric;

a plastic second lens element 220 with negative refractive power having a convex object-side surface 221 and a concave image-side surface 222, the object-side and image-side surfaces 221 and 222 thereof being aspheric;

a plastic third lens element 230 with positive refractive power having a convex object-side surface 231 and a convex image-side surface 232, the object-side and image-side surfaces 231 and 232 thereof being aspheric;

a plastic fourth lens element 240 with negative refractive power having a concave object-side surface 241 and a convex image-side surface 242, the object-side and image-side surfaces 241 and 242 thereof being aspheric;

a plastic fifth lens element 250 with positive refractive power having a convex object-side surface 251 and a concave image-side surface 252, the object-side and image-side surfaces 251 and 252 thereof being aspheric, and the object-side surface 251 of the fifth lens element 250 is convex at the paraxial region, and the shape of the object-side surface 251 changes from convex at the paraxial region thereof to concave while away from the paraxial region thereof; and the image-side surface 252 of the fifth lens element 250 is concave at the paraxial region, and the shape of the image-side surface 252 changes from concave at the paraxial region thereof to convex while away from the paraxial region thereof; and a plastic sixth lens element 260 with negative refractive power having a convex object-side surface 261 and a concave image-side surface 262, the object-side and image-side surfaces 261 and 262 thereof being aspheric, and the image-side surface 262 of the sixth lens element 260 is concave at the paraxial region, and the shape of the image-side surface 262 changes from concave at the paraxial region thereof to convex while away from the paraxial region thereof;

wherein an aperture stop 200 is disposed between the first lens element 210 and the second lens element 220; the optical image lens system further comprises an IR filter 270 disposed between the image-side surface 262 of the sixth lens element 260 and an image plane 280, and the IR filter 270 is made of glass and has no influence on the focal length of the optical image lens system; the optical image lens system further comprises an image sensor 290 provided on the image plane 280.

The detailed optical data of the second embodiment is shown in TABLE 3, and the aspheric surface data is shown in TABLE 4, wherein the units of the curvature radius, the thickness and the focal length are expressed in mm, and HFOV is defined as half of the maximal field of view.

TABLE 3

(Embodiment 2)
f = 3.45 mm, Fno = 2.10, HFOV = 39.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.019 | ASP | 0.445 | Plastic | 1.544 | 55.9 | 4.81 |
| 2 | | −18.587 | ASP | 0.059 | | | | |
| 3 | Ape. Stop | Plano | | 0.043 | | | | |
| 4 | Lens 2 | 1.717 | ASP | 0.240 | Plastic | 1.640 | 23.3 | −10.87 |
| 5 | | 1.302 | ASP | 0.299 | | | | |
| 6 | Lens 3 | 10.648 | ASP | 0.722 | Plastic | 1.544 | 55.9 | 4.09 |
| 7 | | −2.748 | ASP | 0.162 | | | | |
| 8 | Lens 4 | −1.004 | ASP | 0.250 | Plastic | 1.640 | 23.3 | −4.06 |
| 9 | | −1.794 | ASP | 0.084 | | | | |
| 10 | Lens 5 | 1.275 | ASP | 0.280 | Plastic | 1.535 | 56.3 | 3.75 |
| 11 | | 3.239 | ASP | 0.696 | | | | |
| 12 | Lens 6 | 2.404 | ASP | 0.369 | Plastic | 1.535 | 56.3 | −5.62 |
| 13 | | 1.264 | ASP | 0.492 | | | | |
| 14 | IR-filter | Plano | | 0.300 | Glass | 1.517 | 64.2 | — |
| 15 | | Plano | | 0.262 | | | | |
| 16 | Image | Plano | | — | | | | |

Note:
Reference Wavelength is 587.6 nm (d-line)

TABLE 4

Aspheric Coefficients

| Surface # | 1 | 2 | 4 | 5 | 6 | 7 |
|---|---|---|---|---|---|---|
| k = | −6.7117E−01 | −1.0000E+00 | −1.4632E+01 | −6.0262E+00 | −9.4558E+00 | −2.3981E+01 |
| A4 = | 4.0593E−03 | −1.0542E−01 | −2.8718E−02 | −3.6020E−02 | −5.5100E−02 | −1.6167E−01 |
| A6 = | 5.0635E−03 | 3.5303E−01 | 3.9503E−02 | 1.9326E−02 | 1.9441E−02 | −6.7276E−02 |
| A8 = | −1.6436E−02 | −5.2629E−01 | −6.8649E−02 | −9.3850E−03 | −4.1597E−02 | 3.8083E−02 |
| A10 = | 2.9065E−02 | 3.7831E−01 | −2.8766E−03 | −7.3532E−02 | −4.9705E−02 | 7.9446E−02 |
| A12 = | −2.0661E−02 | −1.1722E−01 | −3.2004E−02 | 2.0368E−02 | 7.2803E−02 | −7.9101E−02 |
| A14 = |  |  |  | 2.0323E−02 | −1.3374E−02 | 1.5821E−02 |

| Surface # | 8 | 9 | 10 | 11 | 12 | 13 |
|---|---|---|---|---|---|---|
| k = | −5.7417E+00 | −4.9988E−01 | −7.9072E+00 | 2.3493E−01 | −1.5488E+01 | −3.7294E+00 |
| A4 = | −1.1758E−01 | −6.9721E−02 | 7.8826E−02 | 1.7557E−01 | −1.9002E−01 | −1.8222E−01 |
| A6 = | −2.5100E−01 | −1.8216E−03 | −1.9025E−01 | −3.8131E−01 | 3.5324E−02 | 9.7623E−02 |
| A8 = | 7.5342E−01 | 2.6259E−01 | 9.2275E−02 | 3.0878E−01 | 1.8523E−02 | −4.2574E−02 |
| A10 = | −6.5156E−01 | −2.3476E−01 | −3.0406E−02 | −1.7157E−01 | −1.0336E−02 | 1.2934E−02 |
| A12 = | 2.6873E−01 | 8.8601E−02 | −9.2850E−04 | 6.0698E−02 | 2.2036E−03 | −2.4524E−03 |
| A14 = | −5.0225E−02 | −1.1916E−02 | 2.3757E−03 | −1.1501E−02 | −2.3069E−04 | 2.5592E−04 |
| A16 = |  |  |  | 8.6055E−04 | 9.7129E−06 | −1.1161E−05 |

The equation of the aspheric surface profiles of the second embodiment has the same form as that of the first embodiment. Moreover, the definitions of the parameters of the relations are the same as those set forth in the first embodiment, but the value of the relations of the second embodiment are listed in TABLE 5 as presented below:

TABLE 5

(Embodiment 2)

| f [mm] | 3.45 | f/f2 | −0.32 |
|---|---|---|---|
| Fno | 2.10 | f/f4 | −0.85 |
| HFOV [deg.] | 39.0 | f3/f1 | 0.85 |
| V4/V5 | 0.41 | f5/f3 | 0.92 |
| CT4/CT3 | 0.35 | FOV [deg.] | 78.0 |
| (R9 + R10)/(R9 − R10) | −2.30 | SAG51/CT5 | −0.24 |

Embodiment 3

Figure 3A:
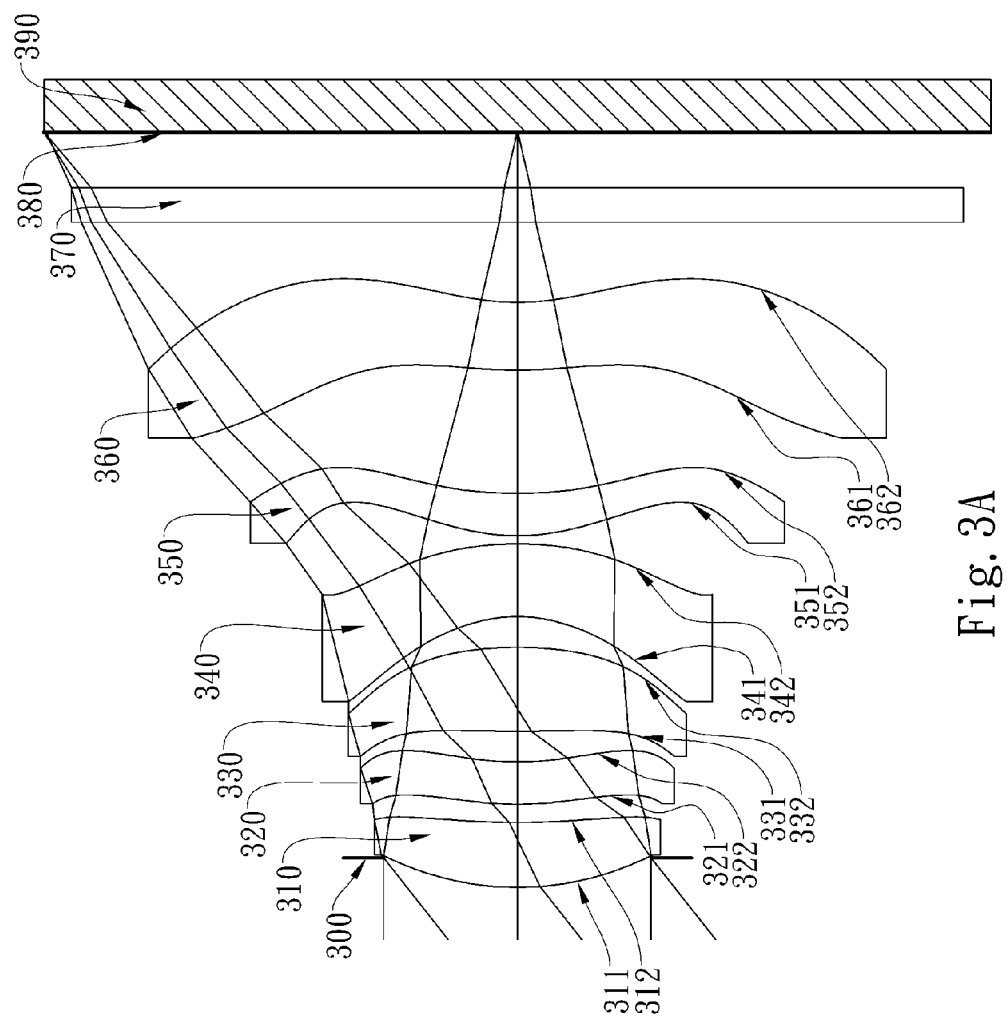
FIG. 3A shows an optical image lens system in accordance with the third embodiment of the present invention.
Figure 3B:
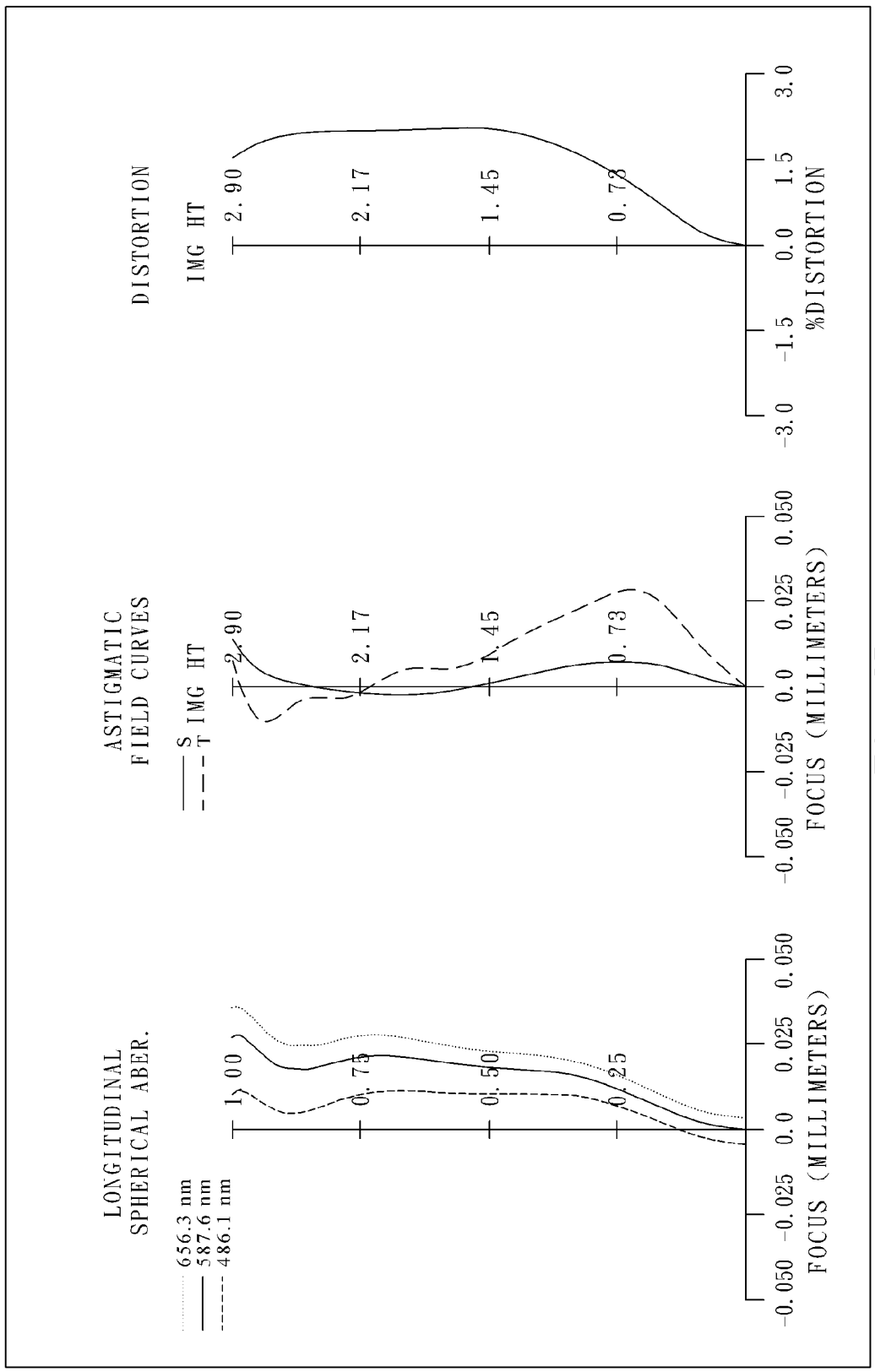
FIG. 3B shows the aberration curves of the third embodiment of the present invention.

FIG. 3A shows an optical image lens system in accordance with the third embodiment of the present invention, and FIG. 3B shows the aberration curves of the third embodiment of the present invention. The optical image lens system of the third embodiment of the present invention mainly comprises six lens elements with refractive power, in order from an object side to an image side:

a plastic first lens element 310 with positive refractive power having a convex object-side surface 311 and a concave image-side surface 312, the object-side and image-side surfaces 311 and 312 thereof being aspheric;

a plastic second lens element 320 with negative refractive power having a convex object-side surface 321 and a concave image-side surface 322, the object-side and image-side surfaces 321 and 322 thereof being aspheric;

a plastic third lens element 330 with positive refractive power having a convex object-side surface 331 and a convex image-side surface 332, the object-side and image-side surfaces 331 and 332 thereof being aspheric;

a plastic fourth lens element 340 with negative refractive power having a concave object-side surface 341 and a convex image-side surface 342, the object-side and image-side surfaces 341 and 342 thereof being aspheric;

a plastic fifth lens element 350 with positive refractive power having a convex object-side surface 351 and a concave image-side surface 352, the object-side and image-side surfaces 351 and 352 thereof being aspheric, and the object-side surface 351 of the fifth lens element 350 is convex at the paraxial region, and the shape of the object-side surface 351 changes from convex at the paraxial region thereof to concave while away from the paraxial region thereof; and the image-side surface 352 of the fifth lens element 350 is concave at the paraxial region, and the shape of the image-side surface 352 changes from concave at the paraxial region thereof to convex while away from the paraxial region thereof; and a plastic sixth lens element 360 with negative refractive power having a convex object-side surface 361 and a concave image-side surface 362, the object-side and image-side surfaces 361 and 362 thereof being aspheric, and the image-side surface 362 of the sixth lens element 360 is concave at the paraxial region, and the shape of the image-side surface 362 changes from concave at the paraxial region thereof to convex while away from the paraxial region thereof;

wherein an aperture stop 300 is disposed between an object and the first lens element 310;

the optical image lens system further comprises an IR filter 370 disposed between the image-side surface 362 of the sixth lens element 360 and an image plane 380, and the IR filter 370 is made of glass and has no influence on the focal length of the optical image lens system; the optical image lens system further comprises an image sensor 390 provided on the image plane 380.

The detailed optical data of the third embodiment is shown in TABLE 6, and the aspheric surface data is shown in TABLE 7, wherein the units of the curvature radius, the thickness and the focal length are expressed in mm, and HFOV is defined as half of the maximal field of view.

TABLE 6

(Embodiment 3)
f = 3.61 mm, Fno = 2.20, HFOV = 38.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.181 | | | | |
| 2 | Lens 1 | 1.798 | ASP | 0.397 | Plastic | 1.544 | 55.9 | 5.84 |
| 3 | | 3.816 | ASP | 0.112 | | | | |
| 4 | Lens 2 | 1.880 | ASP | 0.260 | Plastic | 1.544 | 55.9 | −103.02 |
| 5 | | 1.730 | ASP | 0.188 | | | | |
| 6 | Lens 3 | 10.376 | ASP | 0.515 | Plastic | 1.544 | 55.9 | 3.41 |
| 7 | | −2.223 | ASP | 0.188 | | | | |
| 8 | Lens 4 | −0.904 | ASP | 0.446 | Plastic | 1.640 | 23.3 | −2.81 |
| 9 | | −2.168 | ASP | 0.050 | | | | |
| 10 | Lens 5 | 1.248 | ASP | 0.260 | Plastic | 1.544 | 55.9 | 3.87 |
| 11 | | 2.842 | ASP | 0.756 | | | | |
| 12 | Lens 6 | 2.713 | ASP | 0.415 | Plastic | 1.544 | 55.9 | −6.40 |
| 13 | | 1.443 | ASP | 0.492 | | | | |
| 14 | IR-filter | Plano | | 0.210 | Glass | 1.517 | 64.2 | — |
| 15 | | Plano | | 0.340 | | | | |
| 16 | Image | Plano | | — | | | | |

Note:
Reference Wavelength is 587.6 nm (d-line)

TABLE 7

Aspheric Coefficients

| Surface # | 2 | 3 | 4 | 5 | 6 | 7 |
|---|---|---|---|---|---|---|
| k = | −6.1615E−01 | −3.0000E+01 | −1.2929E+01 | −7.7454E+00 | −2.7826E+01 | −2.2012E+01 |
| A4 = | −5.5162E−04 | −1.4878E−01 | −2.0174E−01 | −1.5716E−01 | −1.0808E−01 | −2.7060E−01 |
| A6 = | 7.4296E−02 | 3.0871E−01 | 1.0398E−01 | −7.1918E−02 | −1.5425E−01 | −3.0028E−02 |
| A8 = | −2.0535E−01 | −4.8054E−01 | −4.1525E−02 | 1.1937E−01 | 1.3556E−01 | 2.1874E−02 |
| A10 = | 3.0192E−01 | 4.0417E−01 | −3.7385E−02 | −1.5043E−01 | −1.8761E−01 | 1.0773E−01 |
| A12 = | −2.0689E−01 | −2.6017E−01 | −1.6619E−01 | −2.4468E−01 | −6.7316E−02 | −1.2042E−01 |
| A14 = | | | | 2.1886E−01 | 1.5329E−01 | 5.2549E−02 |

| Surface # | 8 | 9 | 10 | 11 | 12 | 13 |
|---|---|---|---|---|---|---|
| k = | −4.7789E+00 | 1.5397E−01 | −6.6643E+00 | −1.4252E+00 | −2.3396E+01 | −4.6647E+00 |
| A4 = | −2.7700E−01 | −1.3001E−01 | 7.8826E−02 | 1.7557E−01 | −1.9002E−01 | −1.8222E−01 |
| A6 = | −1.5822E−01 | 5.3624E−02 | −1.9025E−01 | −3.8131E−01 | 3.5324E−02 | 9.7623E−02 |
| A8 = | 6.9041E−01 | 1.8032E−01 | 9.2275E−02 | 3.0878E−01 | 1.8523E−02 | −4.2574E−02 |
| A10 = | −6.9497E−01 | −2.1572E−01 | −3.0406E−02 | −1.7157E−01 | −1.0336E−02 | 1.2934E−02 |
| A12 = | 3.1684E−01 | 9.9644E−02 | −9.2850E−04 | 6.0698E−02 | 2.2036E−03 | −2.4524E−03 |
| A14 = | −4.4129E−02 | −1.2395E−02 | 2.3757E−03 | −1.1501E−02 | −2.3069E−04 | 2.5592E−04 |
| A16 = | | | | 8.6055E−04 | 9.7129E−06 | −1.1161E−05 |

The equation of the aspheric surface profiles of the third embodiment has the same form as that of the first embodiment. Moreover, the definitions of the parameters of the relations are the same as those set forth in the first embodiment, but the value of the relations of the third embodiment are listed in TABLE 8:

TABLE 8

(Embodiment 3)

| f [mm] | 3.61 | f/f2 | −0.04 |
|---|---|---|---|
| Fno | 2.20 | f/f4 | −1.28 |
| HFOV [deg.] | 38.3 | f3/f1 | 0.58 |
| V4/V5 | 0.42 | f5/f3 | 1.13 |
| CT4/CT3 | 0.87 | FOV [deg.] | 76.6 |
| (R9 + R10)/(R9 − R10) | −2.57 | SAG51/CT5 | −0.19 |

Embodiment 4

Figure 4A:
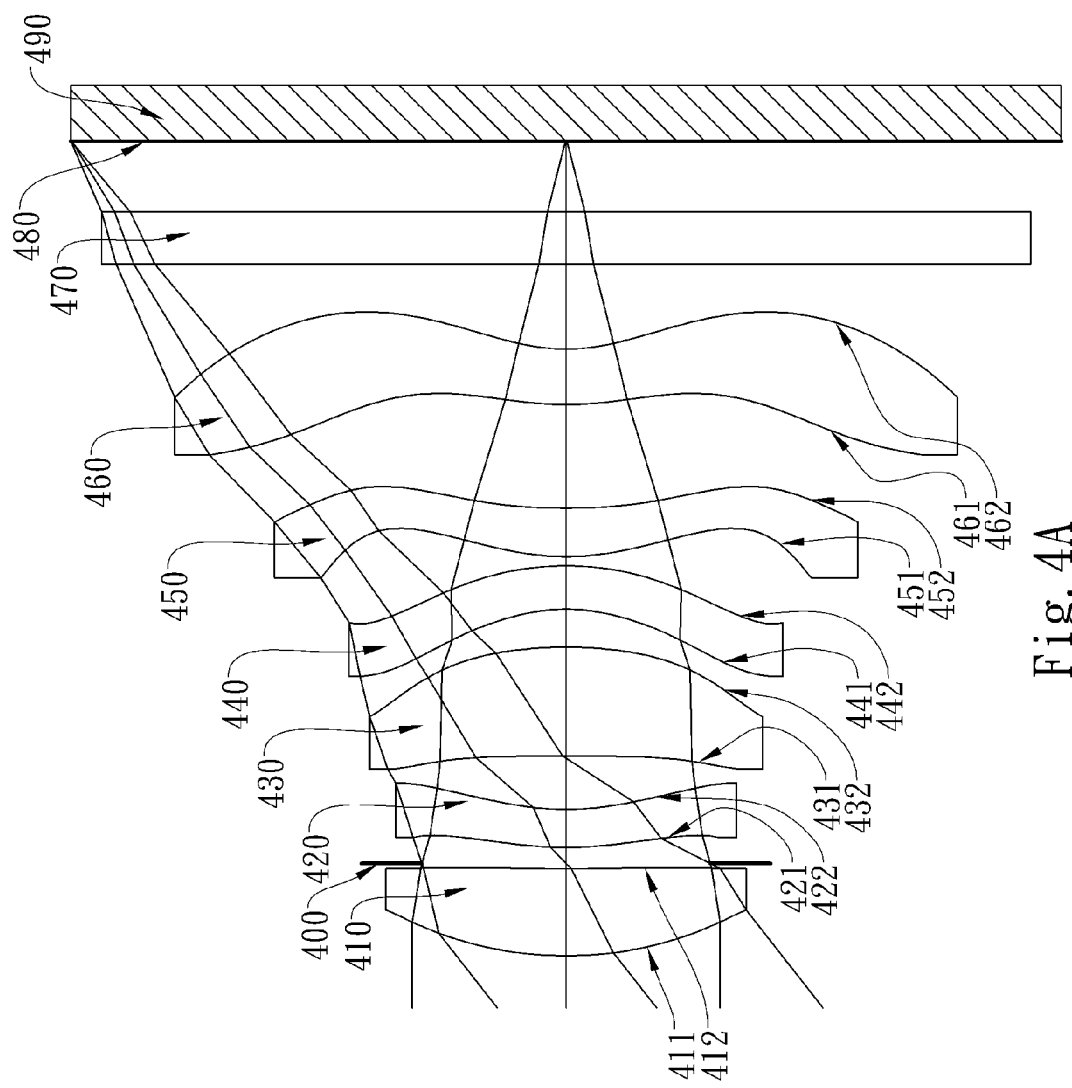
FIG. 4A shows an optical image lens system in accordance with the fourth embodiment of the present invention.
Figure 4B:
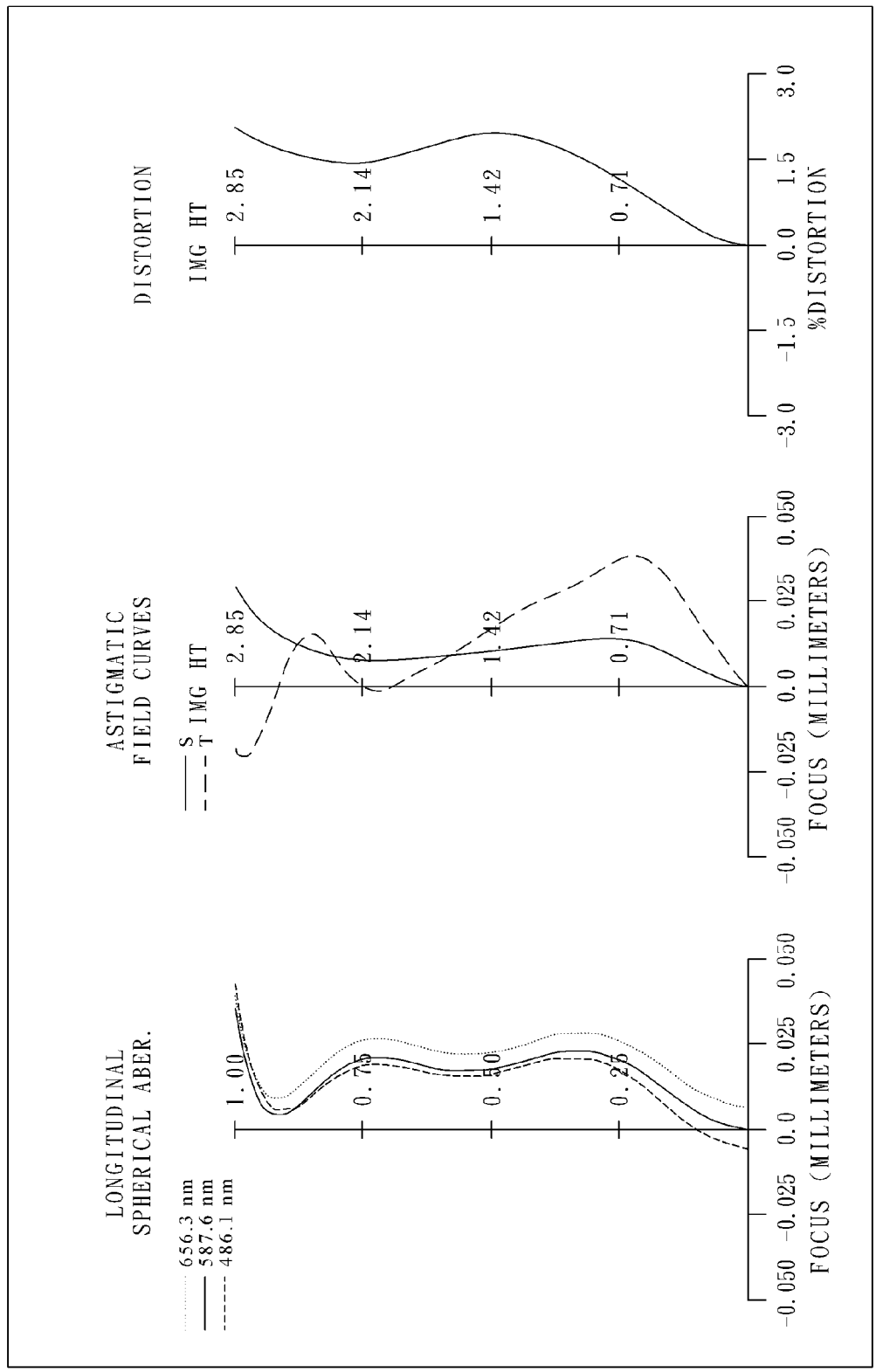
FIG. 4B shows the aberration curves of the fourth embodiment of the present invention.

FIG. 4A shows an optical image lens system in accordance with the fourth embodiment of the present invention, and FIG. 4B shows the aberration curves of the fourth embodiment of the present invention. The optical image lens system of the fourth embodiment of the present invention mainly comprises six lens elements with refractive power, in order from an object side to an image side:

a plastic first lens element 410 with positive refractive power having a convex object-side surface 411 and a concave image-side surface 412, the object-side and image-side surfaces 411 and 412 thereof being aspheric;

a plastic second lens element 420 with negative refractive power having a convex object-side surface 421 and a concave image-side surface 422, the object-side and image-side surfaces 421 and 422 thereof being aspheric;

a plastic third lens element 430 with positive refractive power having a concave object-side surface 431 and a convex image-side surface 432, the object-side and image-side surfaces 431 and 432 thereof being aspheric;

a plastic fourth lens element 440 with negative refractive power having a concave object-side surface 441 and a convex image-side surface 442, the object-side and image-side surfaces 441 and 442 thereof being aspheric;

a plastic fifth lens element 450 with positive refractive power having a convex object-side surface 451 and a concave image-side surface 452, the object-side and image-side surfaces 451 and 452 thereof being aspheric, and the object-side surface 451 of the fifth lens element 450 is convex at the paraxial region, and the shape of the object-side surface 451 changes from convex at the paraxial region thereof to concave while away from the paraxial region thereof; and the image-side surface 452 of the fifth lens element 450 is concave at the paraxial region, and the shape of the image-side surface 452 changes from concave at the paraxial region thereof to convex while away from the paraxial region thereof; and a plastic sixth lens element 460 with negative refractive power having a convex object-side surface 461 and a concave image-side surface 462, the object-side and image-side surfaces 461 and 462 thereof being aspheric, and the image-side surface 462 of the sixth lens element 460 is concave at the paraxial region, and the shape of the image-side surface 462 changes from concave at the paraxial region thereof to convex while away from the paraxial region thereof;

wherein an aperture stop 400 is disposed between the first lens element 410 and the second lens element 420;

the optical image lens system further comprises an IR filter 470 disposed between the image-side surface 462 of the sixth lens element 460 and an image plane 480, and the IR filter 470 is made of glass and has no influence on the focal length of the optical image lens system; the optical image lens system further comprises an image sensor 490 provided on the image plane 480.

The detailed optical data of the fourth embodiment is shown in TABLE 9, and the aspheric surface data is shown in TABLE 10, wherein the units of the curvature radius, the thickness and the focal length are expressed in mm, and HFOV is defined as half of the maximal field of view.

TABLE 9

(Embodiment 4)
f = 3.55 mm, Fno = 2.00, HFOV = 38.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.145 | ASP | 0.501 | Plastic | 1.544 | 55.9 | 5.02 |
| 2 | | 9.144 | ASP | 0.031 | | | | |
| 3 | Ape. Stop | Plano | | 0.092 | | | | |
| 4 | Lens 2 | 1.835 | ASP | 0.220 | Plastic | 1.650 | 21.4 | −16.17 |
| 5 | | 1.488 | ASP | 0.308 | | | | |
| 6 | Lens 3 | −48.254 | ASP | 0.629 | Plastic | 1.544 | 55.9 | 4.70 |
| 7 | | −2.442 | ASP | 0.219 | | | | |
| 8 | Lens 4 | −1.000 | ASP | 0.250 | Plastic | 1.650 | 21.4 | −4.46 |
| 9 | | −1.678 | ASP | 0.053 | | | | |
| 10 | Lens 5 | 1.383 | ASP | 0.280 | Plastic | 1.544 | 55.9 | 3.84 |
| 11 | | 3.807 | ASP | 0.597 | | | | |
| 12 | Lens 6 | 1.723 | ASP | 0.320 | Plastic | 1.544 | 55.9 | −5.50 |
| 13 | | 1.022 | ASP | 0.492 | | | | |
| 14 | IR-filter | Plano | | 0.300 | Glass | 1.517 | 64.2 | — |
| 15 | | Plano | | 0.408 | | | | |
| 16 | Image | Plano | | — | | | | |

Note:
Reference Wavelength is 587.6 nm (d-line)

TABLE 10

| Aspheric Coefficients | | | | | | |
|---|---|---|---|---|---|---|
| Surface # | 1 | 2 | 4 | 5 | 6 | 7 |
| k = | −3.5301E−01 | −1.0000E+00 | −1.4387E+01 | −6.4675E+00 | 0.0000E+00 | −3.0000E+01 |
| A4 = | 1.6027E−03 | −2.0980E−01 | −2.0227E−01 | −1.3637E−01 | −7.8051E−02 | −2.4535E−01 |
| A6 = | 3.5779E−02 | 4.8042E−01 | 2.4971E−01 | 1.3640E−01 | −5.2011E−02 | 1.9680E−02 |
| A8 = | −9.4453E−02 | −6.2558E−01 | −1.6181E−01 | 4.0601E−02 | 8.6959E−02 | 2.9556E−03 |
| A10 = | 1.3773E−01 | 4.1284E−01 | −7.6341E−02 | −2.3242E−01 | −9.0267E−02 | 6.4648E−02 |
| A12 = | −7.4520E−02 | −1.2953E−01 | 1.4483E−02 | 8.9732E−02 | 9.0669E−02 | −5.3463E−02 |
| A14 = | | | | 2.1297E−02 | −2.1326E−02 | 1.8920E−02 |

| Surface # | 8 | 9 | 10 | 11 | 12 | 13 |
|---|---|---|---|---|---|---|
| k = | −6.2794E+00 | −7.2521E−01 | −1.0569E+01 | 2.7775E+00 | −1.2522E+01 | −4.2272E+00 |
| A4 = | −8.8481E−02 | −3.5841E−02 | 7.8826E−02 | 1.7557E−01 | −1.9002E−01 | −1.8222E−01 |
| A6 = | −3.3160E−01 | −4.9259E−02 | −1.9025E−01 | −3.8131E−01 | 3.5324E−02 | 9.7623E−02 |
| A8 = | 7.7610E−01 | 2.4192E−01 | 9.2275E−02 | 3.0878E−01 | 1.8523E−02 | −4.2574E−02 |
| A10 = | −6.3596E−01 | −2.1776E−01 | −3.0406E−02 | −1.7157E−01 | −1.0336E−02 | 1.2934E−02 |
| A12 = | 2.6963E−01 | 9.2580E−02 | −9.2850E−04 | 6.0698E−02 | 2.2036E−03 | −2.4524E−03 |
| A14 = | −5.1030E−02 | −1.4422E−02 | 2.3757E−03 | −1.1501E−02 | −2.3069E−04 | 2.5592E−04 |
| A16 = | | | | 8.6055E−04 | 9.7129E−06 | −1.1161E−05 |

The equation of the aspheric surface profiles of the fourth embodiment has the same form as that of the first embodiment. Moreover, the definitions of the parameters of the relations are the same as those set forth in the first embodiment, but the value of the relations of the fourth embodiment are listed in TABLE 11:

TABLE 11

(Embodiment 4)

| f [mm] | 3.55 | f/f2 | −0.22 |
|---|---|---|---|
| Fno | 2.00 | f/f4 | −0.80 |
| HFOV [deg.] | 38.1 | f3/f1 | 0.94 |
| V4/V5 | 0.38 | f5/f3 | 0.82 |
| CT4/CT3 | 0.40 | FOV [deg.] | 76.2 |
| (R9 + R10)/(R9 − R10) | −2.14 | SAG51/CT5 | −0.44 |

Embodiment 5

Figure 5A:
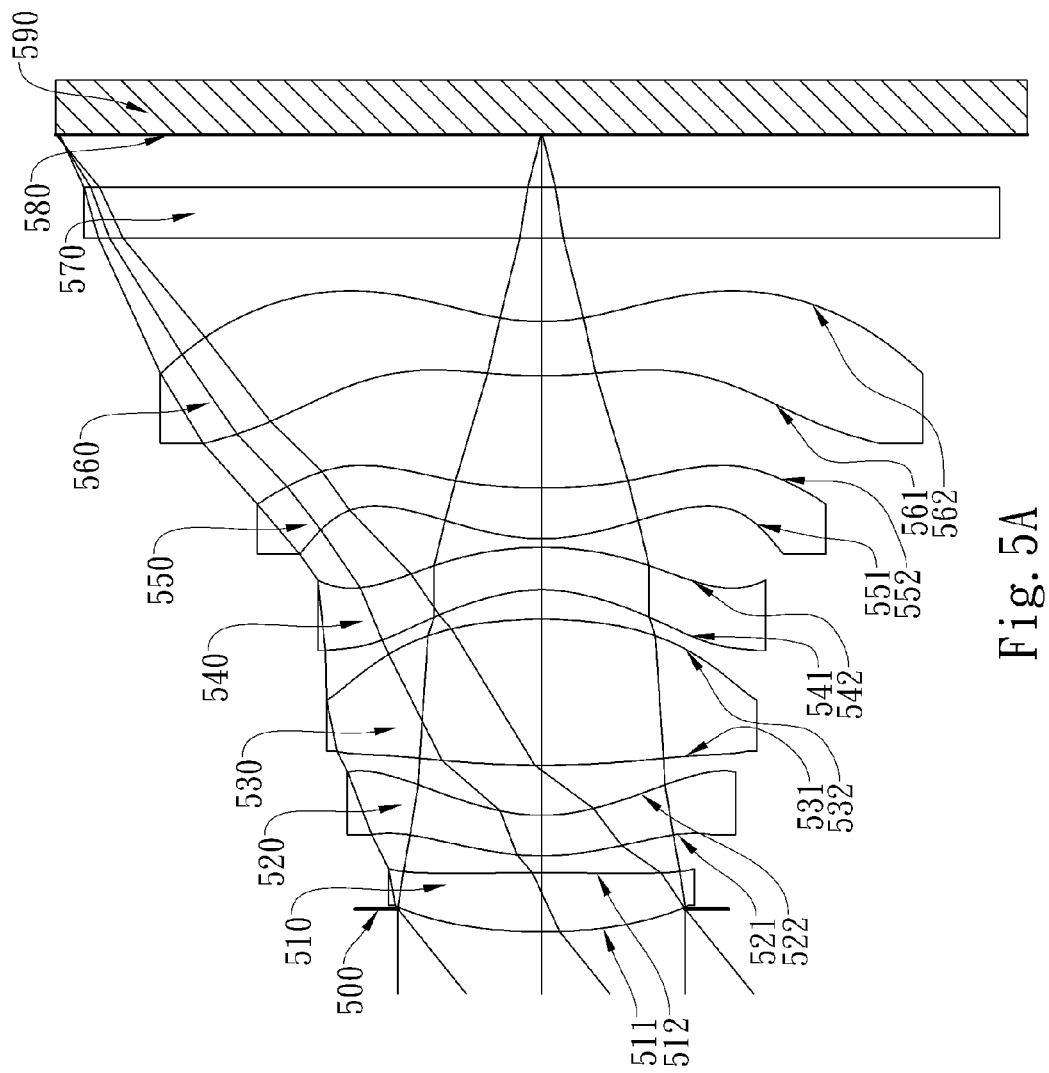
FIG. 5A shows an optical image lens system in accordance with the fifth embodiment of the present invention.
Figure 5B:
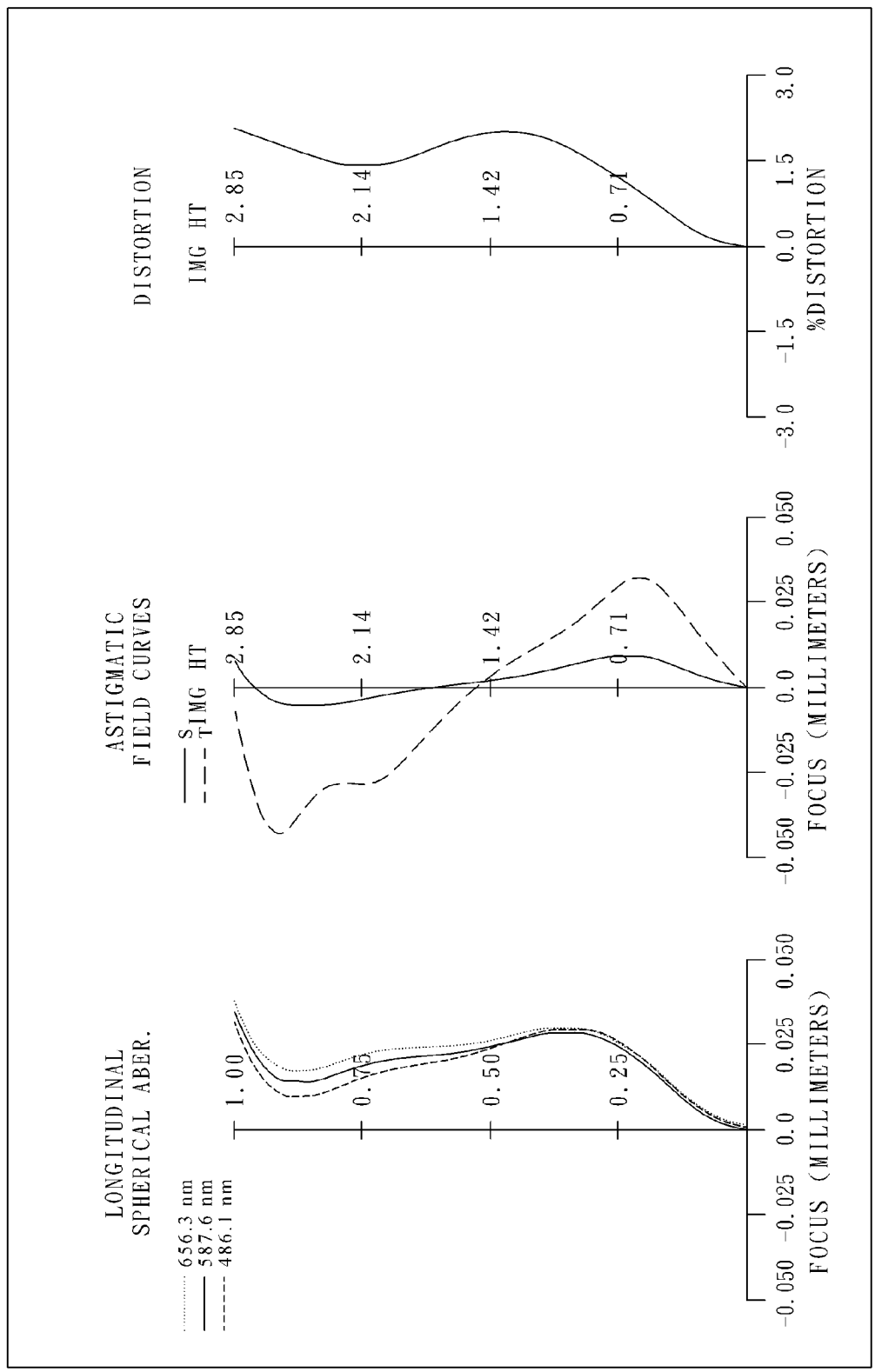
FIG. 5B shows the aberration curves of the fifth embodiment of the present invention.

FIG. 5A shows an optical image lens system in accordance with the fifth embodiment of the present invention, and FIG. 5B shows the aberration curves of the fifth embodiment of the present invention. The optical image lens system of the fifth embodiment of the present invention mainly comprises six lens elements with refractive power, in order from an object side to an image side:

a plastic first lens element 510 with positive refractive power having a convex object-side surface 511 and a convex image-side surface 512, the object-side and image-side surfaces 511 and 512 thereof being aspheric;

a plastic second lens element 520 with negative refractive power having a convex object-side surface 521 and a concave image-side surface 522, the object-side and image-side surfaces 521 and 522 thereof being aspheric;

a plastic third lens element 530 with positive refractive power having a convex object-side surface 531 and a concave image-side surface 532, the object-side and image-side surfaces 531 and 532 thereof being aspheric;

a plastic fourth lens element 540 with negative refractive power having a concave object-side surface 541 and a convex image-side surface 542, the object-side and image-side surfaces 541 and 542 thereof being aspheric;

a plastic fifth lens element 550 with positive refractive power having a convex object-side surface 551 and a concave image-side surface 552, the object-side and image-side surfaces 551 and 552 thereof being aspheric, and the object-side surface 551 of the fifth lens element 550 is convex at the paraxial region, and the shape of the object-side surface 551 changes from convex at the paraxial region thereof to concave while away from the paraxial region thereof; and the image-side surface 552 of the fifth lens element 550 is concave at the paraxial region, and the shape of the image-side surface 552 changes from concave at the paraxial region thereof to convex while away from the paraxial region thereof; and a plastic sixth lens element 560 with negative refractive power having a convex object-side surface 561 and a concave image-side surface 562, the object-side and image-side surfaces 561 and 562 thereof being aspheric, and the image-side surface 562 of the sixth lens element 560 is concave at the paraxial region, and the shape of the image-side surface 562 changes from concave at the paraxial region thereof to convex while away from the paraxial region thereof;

wherein an aperture stop 500 is disposed between an object and the first lens element 510;

the optical image lens system further comprises an IR filter 570 disposed between the image-side surface 562 of the sixth lens element 560 and an image plane 580, and the IR filter 570 is made of glass and has no influence on the focal length of the optical image lens system; the optical image lens system further comprises an image sensor 590 provided on the image plane 580.

The detailed optical data of the fifth embodiment is shown in TABLE 12, and the aspheric surface data is shown in TABLE 13, wherein the units of the curvature radius, the thickness and the focal length are expressed in mm, and HFOV is defined as half of the maximal field of view.

TABLE 12

(Embodiment 5)
f = 3.45 mm, Fno = 2.04, HFOV = 38.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.135 | | | | |
| 2 | Lens 1 | 2.949 | ASP | 0.348 | Plastic | 1.544 | 55.9 | 5.26 |
| 3 | | −93.153 | ASP | 0.100 | | | | |
| 4 | Lens 2 | 1.442 | ASP | 0.240 | Plastic | 1.607 | 26.6 | −9.41 |
| 5 | | 1.079 | ASP | 0.295 | | | | |
| 6 | Lens 3 | 5.589 | ASP | 0.861 | Plastic | 1.535 | 56.3 | 3.51 |
| 7 | | −2.673 | ASP | 0.174 | | | | |
| 8 | Lens 4 | −0.934 | ASP | 0.250 | Plastic | 1.640 | 23.3 | −3.08 |
| 9 | | −1.961 | ASP | 0.050 | | | | |
| 10 | Lens 5 | 1.101 | ASP | 0.300 | Plastic | 1.535 | 56.3 | 2.88 |
| 11 | | 3.483 | ASP | 0.661 | | | | |
| 12 | Lens 6 | 2.598 | ASP | 0.320 | Plastic | 1.535 | 56.3 | −4.98 |
| 13 | | 1.258 | ASP | 0.492 | | | | |
| 14 | IR-filter | Plano | | 0.300 | Glass | 1.517 | 64.2 | — |
| 15 | | Plano | | 0.310 | | | | |
| 16 | Image | Plano | | — | | | | |

Note:
Reference Wavelength is 587.6 nm (d-line)

TABLE 13

Aspheric Coefficients

| Surface # | 2 | 3 | 4 | 5 | 6 | 7 |
|---|---|---|---|---|---|---|
| k =   | 1.0759E+00  | −1.0000E+00 | −1.0476E+01 | −4.4907E+00 | −7.6008E−01 | −3.0000E+01 |
| A4 =  | 2.6863E−02  | −8.0097E−02 | −2.3780E−02 | −1.0494E−02 | −2.2086E−02 | −1.5677E−01 |
| A6 =  | 2.5826E−03  | 3.6776E−01  | −4.0560E−02 | −4.5100E−02 | 2.3824E−02  | −6.0743E−02 |
| A8 =  | 2.2007E−02  | −5.4269E−01 | −1.0662E−02 | 3.2200E−02  | −2.9224E−02 | 4.5091E−02  |
| A10 = | −3.1875E−02 | 3.9632E−01  | 6.5858E−03  | −3.9406E−02 | −4.0165E−02 | 7.4436E−02  |
| A12 = | 4.2006E−02  | −6.7759E−02 | −1.3808E−02 | 9.3518E−03  | 5.2610E−02  | −8.3910E−02 |
| A14 = |             |             |             | 9.4850E−04  | −1.3158E−02 | 2.4807E−02  |

| Surface # | 8 | 9 | 10 | 11 | 12 | 13 |
|---|---|---|---|---|---|---|
| k =   | −7.0932E+00 | −8.0672E−01 | −9.0065E+00 | 9.8634E−01  | −2.0449E+01 | −4.0909E+00 |
| A4 =  | −6.2904E−02 | −5.9013E−02 | 7.8826E−02  | 1.7557E−01  | −1.9002E−01 | −1.8222E−01 |
| A6 =  | −3.0573E−01 | 5.7710E−03  | −1.9025E−01 | −3.8131E−01 | 3.5324E−02  | 9.7623E−02  |
| A8 =  | 7.5298E−01  | 2.2995E−01  | 9.2275E−02  | 3.0878E−01  | 1.8523E−02  | −4.2574E−02 |
| A10 = | −6.4265E−01 | −2.2931E−01 | −3.0406E−02 | −1.7157E−01 | −1.0336E−02 | 1.2934E−02  |
| A12 = | 2.6980E−01  | 1.0103E−01  | −9.2850E−04 | 6.0698E−02  | 2.2036E−03  | −2.4524E−03 |
| A14 = | −4.7907E−02 | −1.7497E−02 | 2.3757E−03  | −1.1501E−02 | −2.3069E−04 | 2.5592E−04  |
| A16 = |             |             |             | 8.6055E−04  | 9.7129E−06  | −1.1161E−05 |

The equation of the aspheric surface profiles of the fifth embodiment has the same form as that of the first embodiment. Moreover, the definitions of the parameters of the relations are the same as those set forth in the first embodiment, but the value of the relations of the fifth embodiment are listed in the following TABLE 14:

TABLE 14

(Embodiment 5)

| f [mm] | 3.45 | f/f2 | −0.37 |
|---|---|---|---|
| Fno | 2.04 | f/f4 | −1.12 |
| HFOV [deg.] | 38.8 | f3/f1 | 0.67 |
| V4/V5 | 0.41 | f5/f3 | 0.82 |
| CT4/CT3 | 0.29 | FOV [deg.] | 77.6 |
| (R9 + R10)/(R9 − R10) | −1.92 | SAG51/CT5 | −0.30 |

Embodiment 6

Figure 6A:
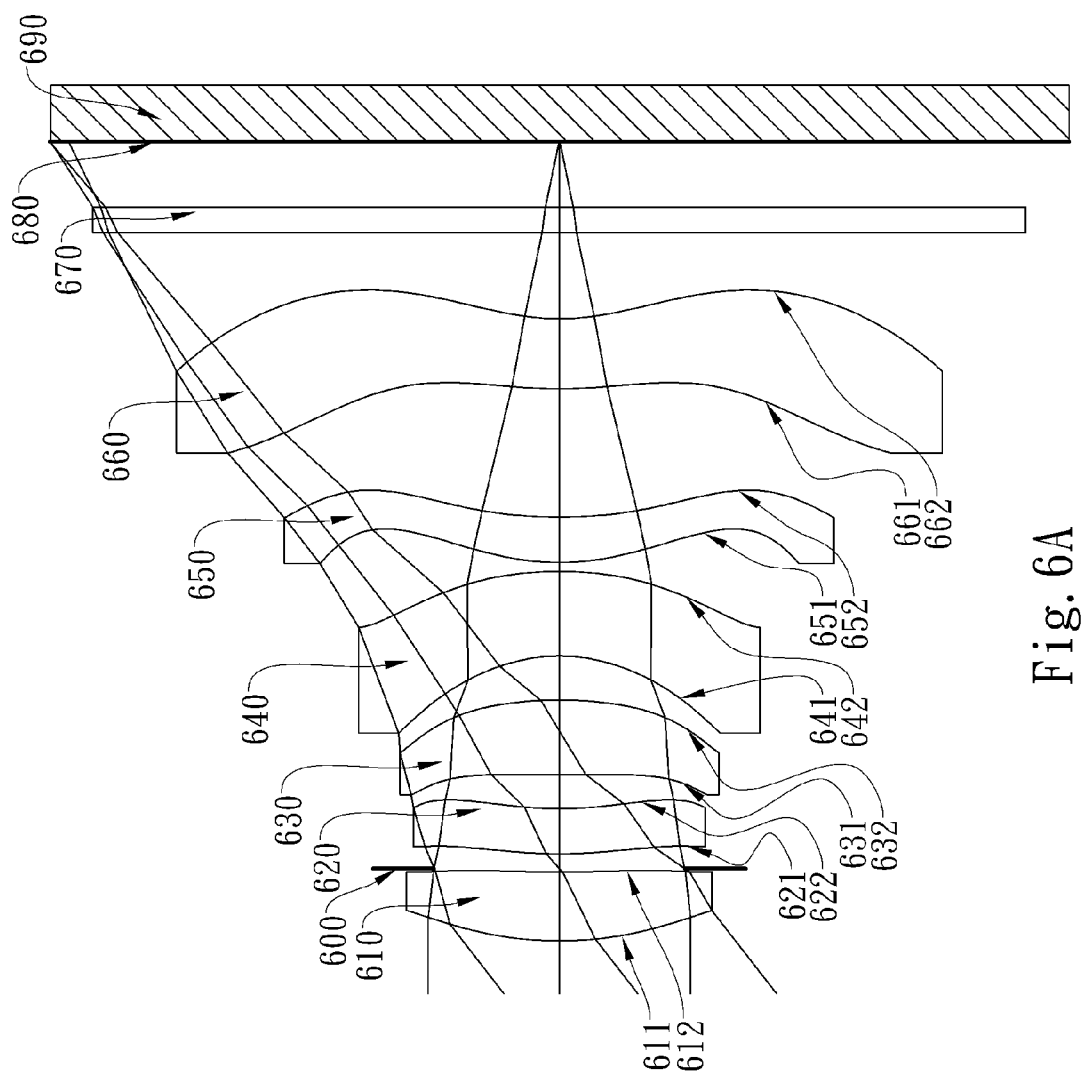
FIG. 6A shows an optical image lens system in accordance with the sixth embodiment of the present invention.
Figure 6B:
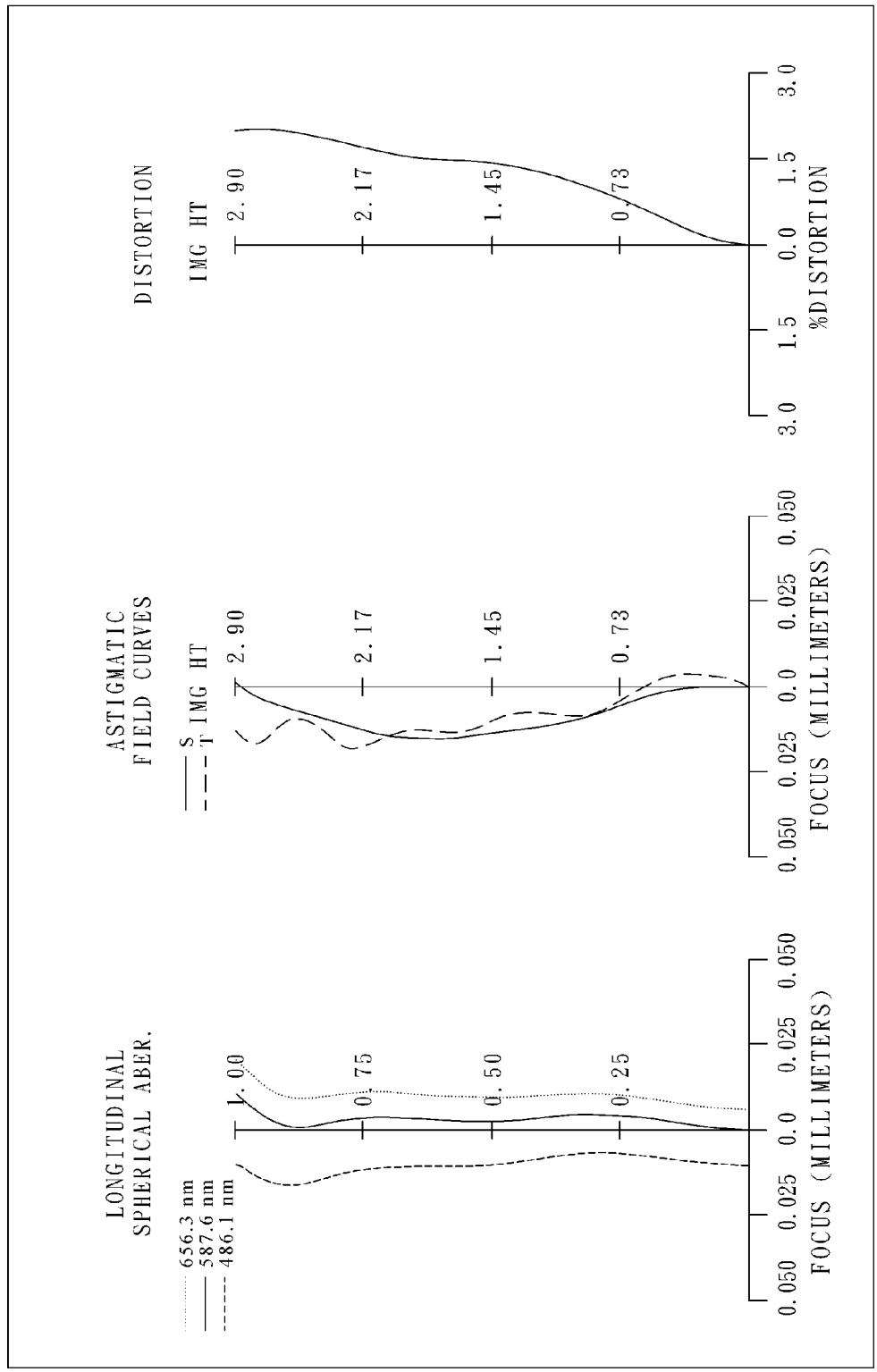
FIG. 6B shows the aberration curves of the sixth embodiment of the present invention.

FIG. 6A shows an optical image lens system in accordance with the sixth embodiment of the present invention, and FIG. 6B shows the aberration curves of the sixth embodiment of the present invention. The optical image lens system of the sixth embodiment of the present invention mainly comprises six lens elements with refractive power, in order from an object side to an image side:

a plastic first lens element 610 with positive refractive power having a convex object-side surface 611 and a concave image-side surface 612, the object-side and image-side surfaces 611 and 612 thereof being aspheric;

a plastic second lens element 620 with negative refractive power having a convex object-side surface 621 and a concave image-side surface 622, the object-side and image-side surfaces 621 and 622 thereof being aspheric;

a plastic third lens element 630 with positive refractive power having a convex object-side surface 631 and a convex image-side surface 632, the object-side and image-side surfaces 631 and 632 thereof being aspheric;

a plastic fourth lens element 640 with negative refractive power having a concave object-side surface 641 and a convex image-side surface 642, the object-side and image-side surfaces 641 and 642 thereof being aspheric;

a plastic fifth lens element 650 with positive refractive power having a convex object-side surface 651 and a concave image-side surface 652, the object-side and image-side surfaces 651 and 652 thereof being aspheric, and the object-side surface 651 of the fifth lens element 650 is convex at the paraxial region, and the shape of the object-side surface 651 changes from convex at the paraxial region thereof to concave while away from the paraxial region thereof; and the image-side surface 652 of the fifth lens element 650 is concave at the paraxial region, and the shape of the image-side surface 652 changes from concave at the paraxial region thereof to convex while away from the paraxial region thereof; and a plastic sixth lens element 660 with negative refractive power having a convex object-side surface 661 and a concave image-side surface 662, the object-side and image-side surfaces 661 and 662 thereof being aspheric, and the image-side surface 662 of the sixth lens element 660 is concave at the paraxial region, and the shape of the image-side surface 662 changes from concave at the paraxial region thereof to convex while away from the paraxial region thereof;

wherein an aperture stop 600 is disposed between the first lens element 610 and the second lens element 620;

the optical image lens system further comprises an IR filter 670 disposed between the image-side surface 662 of the sixth lens element 660 and an image plane 680, and the IR filter 670 is made of glass and has no influence on the focal length of the optical image lens system; the optical image lens system further comprises an image sensor 690 provided on the image plane 680.

The detailed optical data of the sixth embodiment is shown in TABLE 15, and the aspheric surface data is shown in TABLE 16, wherein the units of the curvature radius, the thickness and the focal length are expressed in mm, and HFOV is defined as half of the maximal field of view.

TABLE 15

(Embodiment 6)
f = 3.66 mm, Fno = 2.45, HFOV = 37.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.977 | ASP | 0.393 | Plastic | 1.544 | 55.9 | 4.93 |
| 2 | | 7.007 | ASP | 0.021 | | | | |
| 3 | Ape. Stop | Plano | | 0.082 | | | | |
| 4 | Lens 2 | 2.220 | ASP | 0.258 | Plastic | 1.544 | 55.9 | −33.99 |
| 5 | | 1.901 | ASP | 0.194 | | | | |
| 6 | Lens 3 | 16.200 | ASP | 0.426 | Plastic | 1.544 | 55.9 | 3.82 |
| 7 | | −2.359 | ASP | 0.252 | | | | |
| 8 | Lens 4 | −0.953 | ASP | 0.483 | Plastic | 1.640 | 23.3 | −3.35 |
| 9 | | −2.055 | ASP | 0.050 | | | | |
| 10 | Lens 5 | 1.387 | ASP | 0.260 | Plastic | 1.535 | 56.3 | 4.55 |
| 11 | | 3.018 | ASP | 0.731 | | | | |
| 12 | Lens 6 | 2.531 | ASP | 0.400 | Plastic | 1.535 | 56.3 | −5.66 |
| 13 | | 1.302 | ASP | 0.492 | | | | |
| 14 | IR-filter | Plano | | 0.145 | Glass | 1.517 | 64.2 | — |
| 15 | | Plano | | 0.373 | | | | |
| 16 | Image | Plano | | — | | | | |

Note:
Reference Wavelength is 587.6 nm (d-line)

TABLE 16

Aspheric Coefficients

| Surface # | 1 | 2 | 4 | 5 | 6 | 7 |
|---|---|---|---|---|---|---|
| k = | −1.4480E+00 | −1.9927E+01 | −1.8841E+01 | −1.3316E+01 | −2.0000E+01 | −1.4925E+01 |
| A4 = | −1.4590E−02 | −2.7700E−01 | −3.1227E−01 | −2.0014E−01 | −1.7387E−01 | −2.2744E−01 |
| A6 = | 6.1853E−02 | 6.6002E−01 | 6.3095E−01 | 2.7874E−02 | −2.3567E−01 | −1.5607E−01 |
| A8 = | −2.1829E−01 | −1.1607E+00 | −9.2024E−01 | 7.4832E−01 | 3.2134E−01 | 1.9249E−01 |
| A10 = | 2.9158E−01 | 1.2330E+00 | 9.8661E−01 | −3.0239E−01 | −2.0288E−01 | −2.6295E−02 |
| A12 = | −1.7506E−01 | −6.4760E−01 | −8.1862E−01 | −2.8393E−01 | −9.8689E−01 | −3.7794E−01 |
| A14 = | | | | 3.3680E−01 | 1.2906E+00 | 4.2243E−01 |

| Surface # | 8 | 9 | 10 | 11 | 12 | 13 |
|---|---|---|---|---|---|---|
| k = | −4.6061E+00 | −3.2562E−01 | −6.7958E+00 | −5.5821E−01 | −2.0000E+01 | −4.5612E+00 |
| A4 = | −2.7912E−01 | −1.0861E−01 | 7.8826E−02 | 1.7557E−01 | −1.9002E−01 | −1.8222E−01 |
| A6 = | −3.8603E−02 | 7.8138E−02 | −1.9025E−01 | −3.8131E−01 | 3.5324E−02 | 9.7623E−02 |
| A8 = | 3.9895E−01 | 6.4425E−02 | 9.2275E−02 | 3.0878E−01 | 1.8523E−02 | −4.2574E−02 |
| A10 = | −6.8981E−01 | −1.0972E−01 | −3.0406E−02 | −1.7157E−01 | −1.0336E−02 | 1.2934E−02 |
| A12 = | 5.7554E−01 | 6.1316E−02 | −9.2850E−04 | 6.0698E−02 | 2.2036E−03 | −2.4524E−03 |
| A14 = | −1.5985E−01 | −7.3865E−03 | 2.3757E−03 | −1.1501E−02 | −2.3069E−04 | 2.5592E−04 |
| A16 = | | | | 8.6055E−04 | 9.7129E−06 | −1.1161E−05 |

The equation of the aspheric surface profiles of the sixth embodiment has the same form as that of the first embodiment. Moreover, the definitions of the parameters of the relations are the same as those set forth in the first embodiment, but the value of the relations of the sixth embodiment are listed in TABLE 17:

TABLE 17

(Embodiment 6)

| f [mm] | 3.66 | f/f2 | −0.11 |
|---|---|---|---|
| Fno | 2.45 | f/f4 | −1.09 |
| HFOV [deg.] | 37.8 | f3/f1 | 0.77 |
| V4/V5 | 0.41 | f5/f3 | 1.19 |
| CT4/CT3 | 1.13 | FOV [deg.] | 75.6 |
| (R9 + R10)/(R9 − R10) | −2.70 | SAG51/CT5 | −0.02 |

Embodiment 7

Figure 7A:
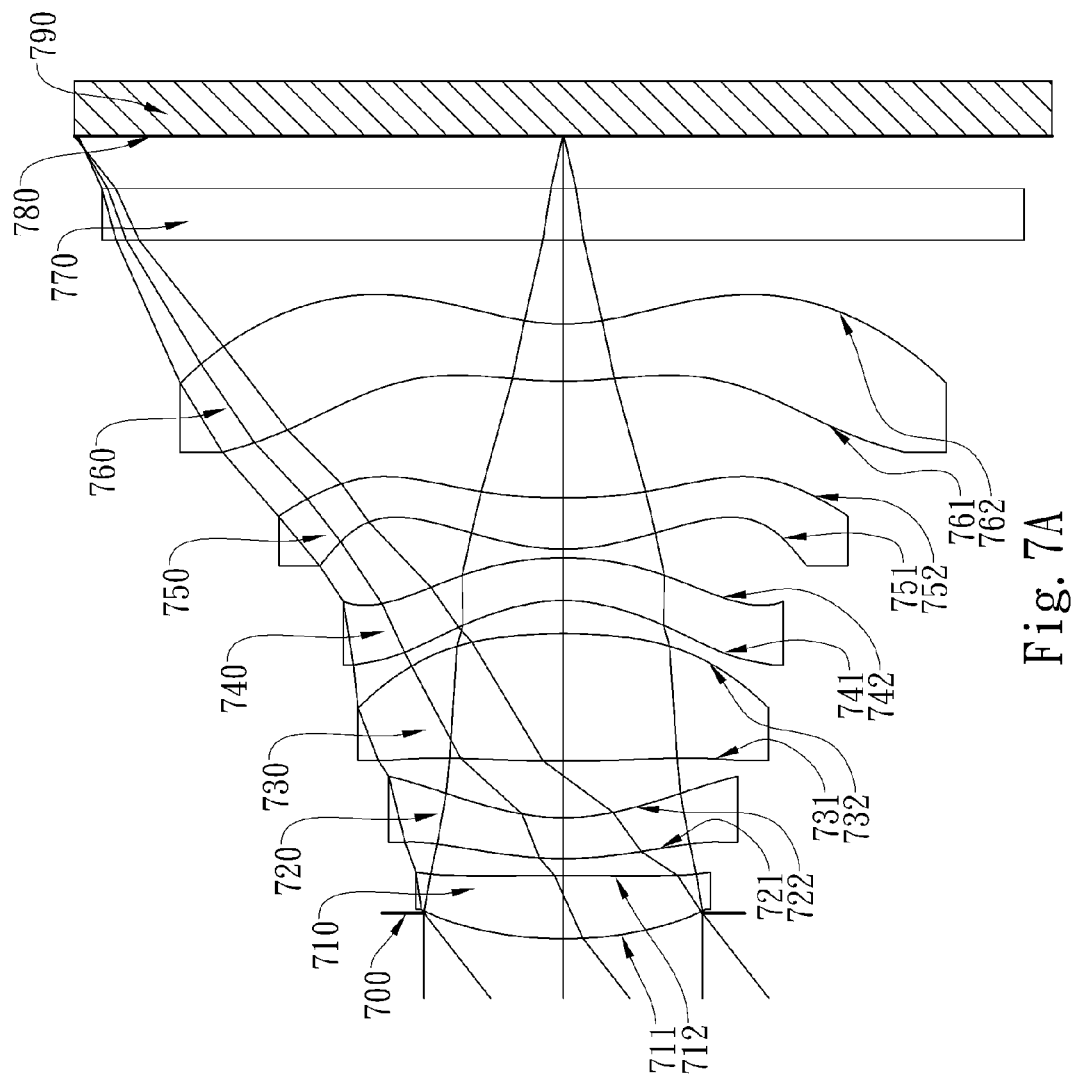
FIG. 7A shows an optical image lens system in accordance with the seventh embodiment of the present invention.
Figure 7B:
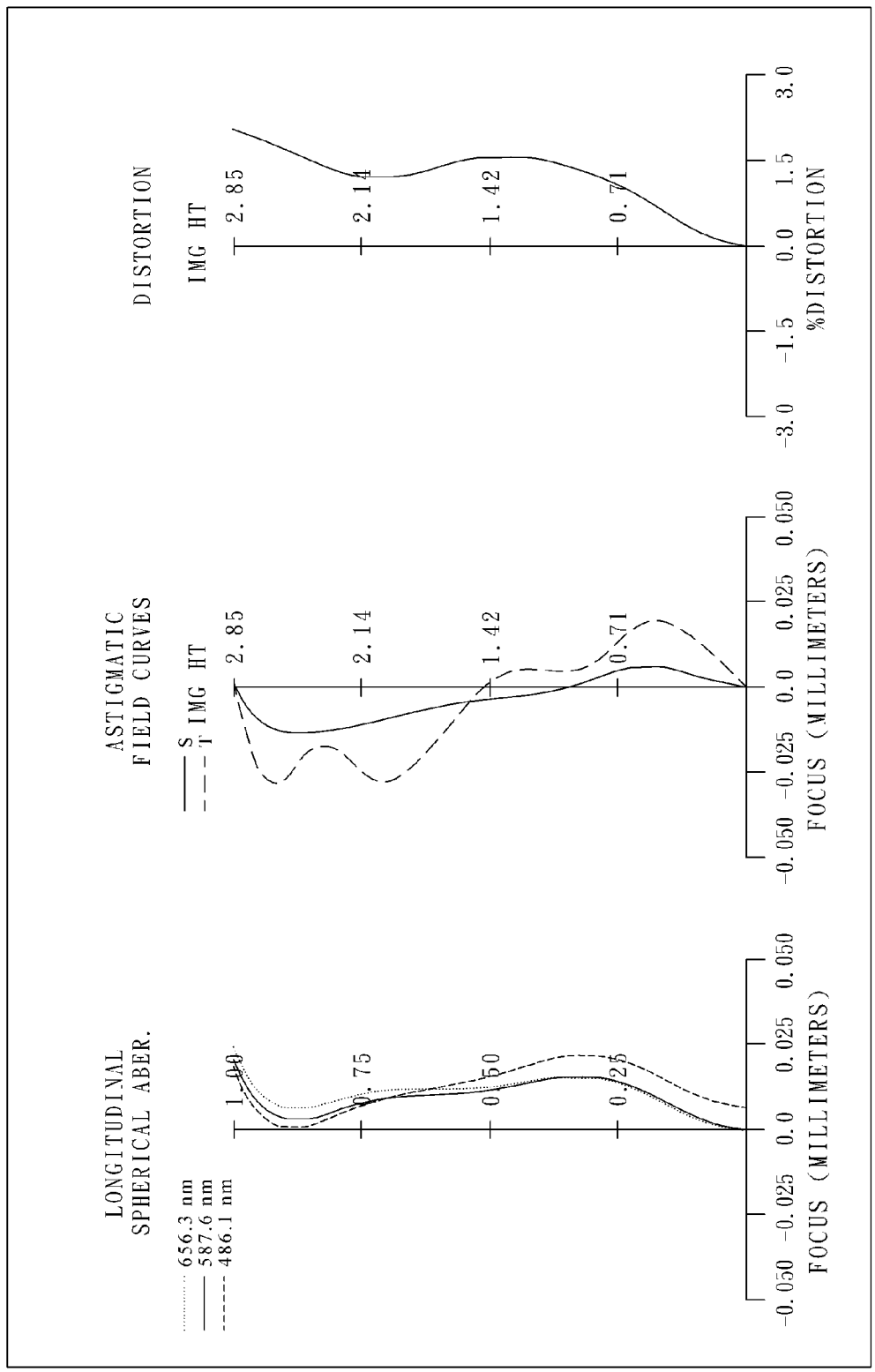
FIG. 7B shows the aberration curves of the seventh embodiment of the present invention.

FIG. 7A shows an optical image lens system in accordance with the seventh embodiment of the present invention, and FIG. 7B shows the aberration curves of the seventh embodiment of the present invention. The optical image lens system of the seventh embodiment of the present invention mainly comprises six lens elements with refractive power, in order from an object side to an image side:

a glass first lens element 710 with positive refractive power having a convex object-side surface 711 and a convex image-side surface 712, the object-side and image-side surfaces 711 and 712 thereof being aspheric;

a plastic second lens element 720 with negative refractive power having a convex object-side surface 721 and a concave image-side surface 722, the object-side and image-side surfaces 721 and 722 thereof being aspheric;

a plastic third lens element 730 with positive refractive power having a convex object-side surface 731 and a convex image-side surface 732, the object-side and image-side surfaces 731 and 732 thereof being aspheric;

a plastic fourth lens element 740 with negative refractive power having a concave object-side surface 741 and a convex image-side surface 742, the object-side and image-side surfaces 741 and 742 thereof being aspheric;

a plastic fifth lens element 750 with positive refractive power having a convex object-side surface 751 and a concave image-side surface 752, the object-side and image-side surfaces 751 and 752 thereof being aspheric, and the object-side surface 751 of the fifth lens element 750 is convex at the paraxial region, and the shape of the object-side surface 751 changes from convex at the paraxial region thereof to concave while away from the paraxial region thereof; and the image-side surface 752 of the fifth lens element 750 is concave at the paraxial region, and the shape of the image-side surface 752 changes from concave at the paraxial region thereof to convex while away from the paraxial region thereof; and a plastic sixth lens element 760 with negative refractive power having a convex object-side surface 761 and a concave image-side surface 762, the object-side and image-side surfaces 761 and 762 thereof being aspheric, and the image-side surface 762 of the sixth lens element 760 is concave at the paraxial region, and the shape of the image-side surface 762 changes from concave at the paraxial region thereof to convex while away from the paraxial region thereof;

wherein an aperture stop 700 is disposed between an object and the first lens element 710;

the optical image lens system further comprises an IR filter 770 disposed between the image-side surface 762 of the sixth lens element 760 and an image plane 780, and the IR filter 770 is made of glass and has no influence on the focal length of the optical image lens system; the optical image lens system further comprises an image sensor 790 provided on the image plane 780.

The detailed optical data of the seventh embodiment is shown in TABLE 18, and the aspheric surface data is shown in TABLE 19, wherein the units of the curvature radius, the thickness and the focal length are expressed in mm, and HFOV is defined as half of the maximal field of view.

TABLE 18

(Embodiment 7)
f = 3.58 mm, Fno = 2.20, HFOV = 37.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.151 | | | | |
| 2 | Lens 1 | 2.327 | ASP | 0.369 | Glass | 1.566 | 61.1 | 4.02 |
| 3 | | −94.148 | ASP | 0.100 | | | | |
| 4 | Lens 2 | 1.970 | ASP | 0.240 | Plastic | 1.607 | 26.6 | −6.69 |
| 5 | | 1.265 | ASP | 0.331 | | | | |
| 6 | Lens 3 | 7.607 | ASP | 0.747 | Plastic | 1.535 | 56.3 | 4.40 |
| 7 | | −3.293 | ASP | 0.194 | | | | |
| 8 | Lens 4 | −0.959 | ASP | 0.250 | Plastic | 1.640 | 23.3 | −3.69 |
| 9 | | −1.779 | ASP | 0.050 | | | | |
| 10 | Lens 5 | 1.190 | ASP | 0.300 | Plastic | 1.535 | 56.3 | 3.16 |
| 11 | | 3.676 | ASP | 0.684 | | | | |
| 12 | Lens 6 | 2.487 | ASP | 0.335 | Plastic | 1.535 | 56.3 | −5.10 |
| 13 | | 1.240 | ASP | 0.492 | | | | |
| 14 | IR-filter | Plano | | 0.300 | Glass | 1.517 | 64.2 | — |
| 15 | | Plano | | 0.308 | | | | |
| 16 | Image | Plano | | — | | | | |

Note:
Reference Wavelength is 587.6 nm (d-line)

TABLE 19

| Aspheric Coefficients | | | | | | |
|---|---|---|---|---|---|---|
| Surface # | 2 | 3 | 4 | 5 | 6 | 7 |
| k = | 2.0334E−01 | −1.0000E+00 | −2.2046E+01 | −6.9688E+00 | −3.0000E+01 | −3.0000E+01 |
| A4 = | 1.5000E−02 | −5.3975E−02 | −1.5515E−02 | 3.1792E−02 | −5.3692E−02 | −1.4866E−01 |
| A6 = | 1.4281E−02 | 3.3101E−01 | 1.8953E−02 | −4.1135E−02 | 2.2256E−02 | −8.3818E−02 |
| A8 = | 3.1077E−02 | −5.1860E−02 | −4.5852E−02 | 2.1767E−02 | −3.0672E−02 | 5.4273E−02 |
| A10 = | −5.0221E−02 | 3.9897E−01 | −4.5622E−02 | −4.3091E−02 | −3.3724E−02 | 8.1333E−02 |
| A12 = | 5.4398E−02 | −7.5482E−02 | 3.1751E−02 | 8.0083E−03 | 5.9099E−02 | −8.4371E−02 |
| A14 = | | | | 1.1446E−02 | −1.5546E−02 | 2.1378E−02 |
| Surface # | 8 | 9 | 10 | 11 | 12 | 13 |
| k = | −6.0624E+00 | −8.1683E−01 | −8.9349E+00 | 1.3753E+00 | −2.4026E+01 | −4.6029E+00 |
| A4 = | −7.0575E−02 | −5.7849E−02 | 7.8826E−02 | 1.7557E−01 | −1.9002E−01 | −1.8222E−01 |
| A6 = | −2.9435E−01 | 1.0028E−02 | −1.9025E−01 | −3.8131E−01 | 3.5324E−02 | 9.7623E−02 |
| A8 = | 7.5303E−01 | 2.2709E−01 | 9.2275E−02 | 3.0878E−01 | 1.8523E−02 | −4.2574E−02 |
| A10 = | −6.4391E−01 | −2.3198E−01 | −3.0406E−02 | −1.7157E−01 | −1.0336E−02 | 1.2934E−02 |
| A12 = | 2.6898E−01 | 1.0079E−01 | −9.2850E−04 | 6.0698E−02 | 2.2036E−03 | −2.4524E−03 |
| A14 = | −4.8264E−02 | −1.6498E−02 | 2.3757E−03 | −1.1501E−02 | −2.3069E−04 | 2.5592E−04 |
| A16 = | | | | 8.6055E−04 | 9.7129E−06 | −1.1161E−05 |

The equation of the aspheric surface profiles of the seventh embodiment has the same form as that of the first embodiment. Moreover, the definitions of the parameters of the relations are the same as those set forth in the first embodiment, but the value of the relations of the seventh embodiment are listed in the following TABLE 20:

TABLE 20

(Embodiment 7)

| f [mm] | 3.58 | f/f2 | −0.54 |
|---|---|---|---|
| Fno | 2.20 | f/f4 | −0.97 |
| HFOV [deg.] | 37.9 | f3/f1 | 1.10 |
| V4/V5 | 0.41 | f5/f3 | 0.72 |
| CT4/CT3 | 0.33 | FOV [deg.] | 75.8 |
| (R9 + R10)/(R9 − R10) | −1.96 | SAG51/CT5 | −0.33 |

Embodiment 8

Figure 8A:
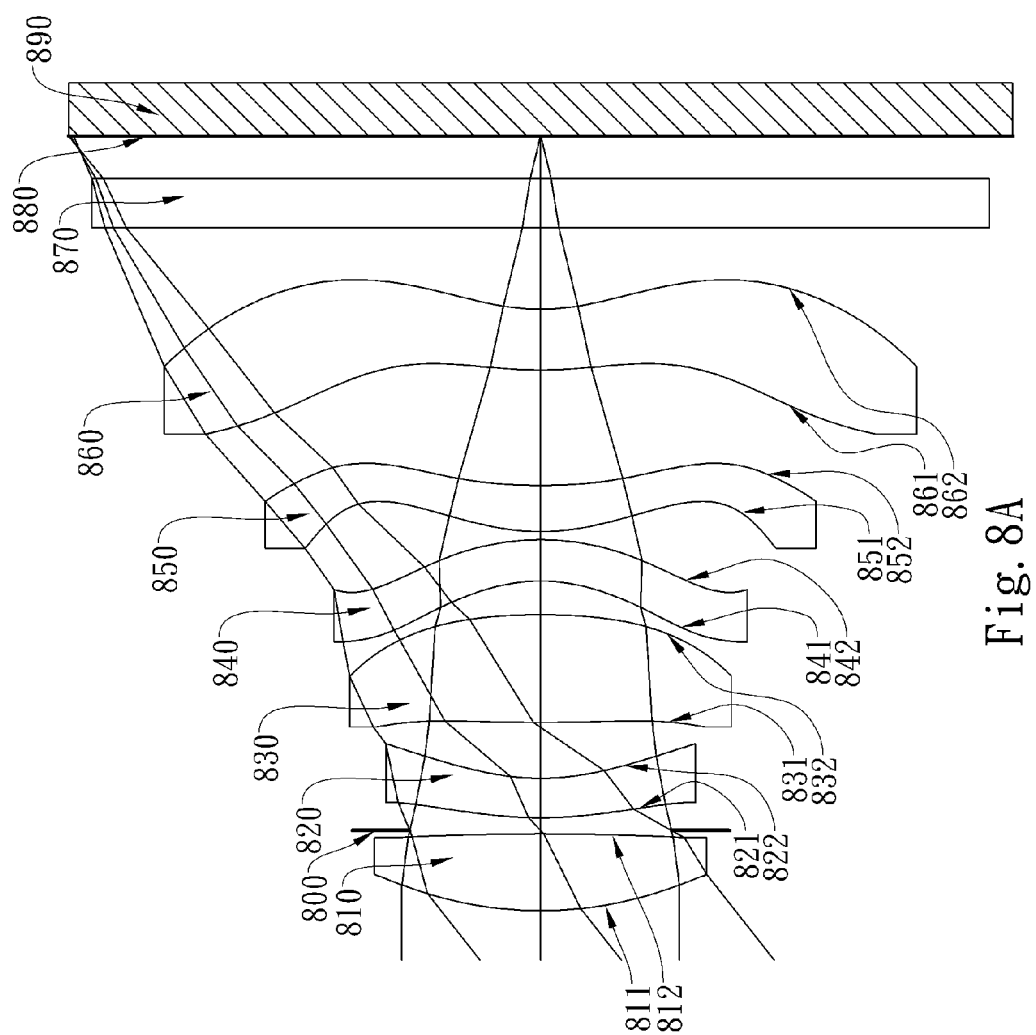
FIG. 8A shows an optical image lens system in accordance with the eighth embodiment of the present invention.
Figure 8B:
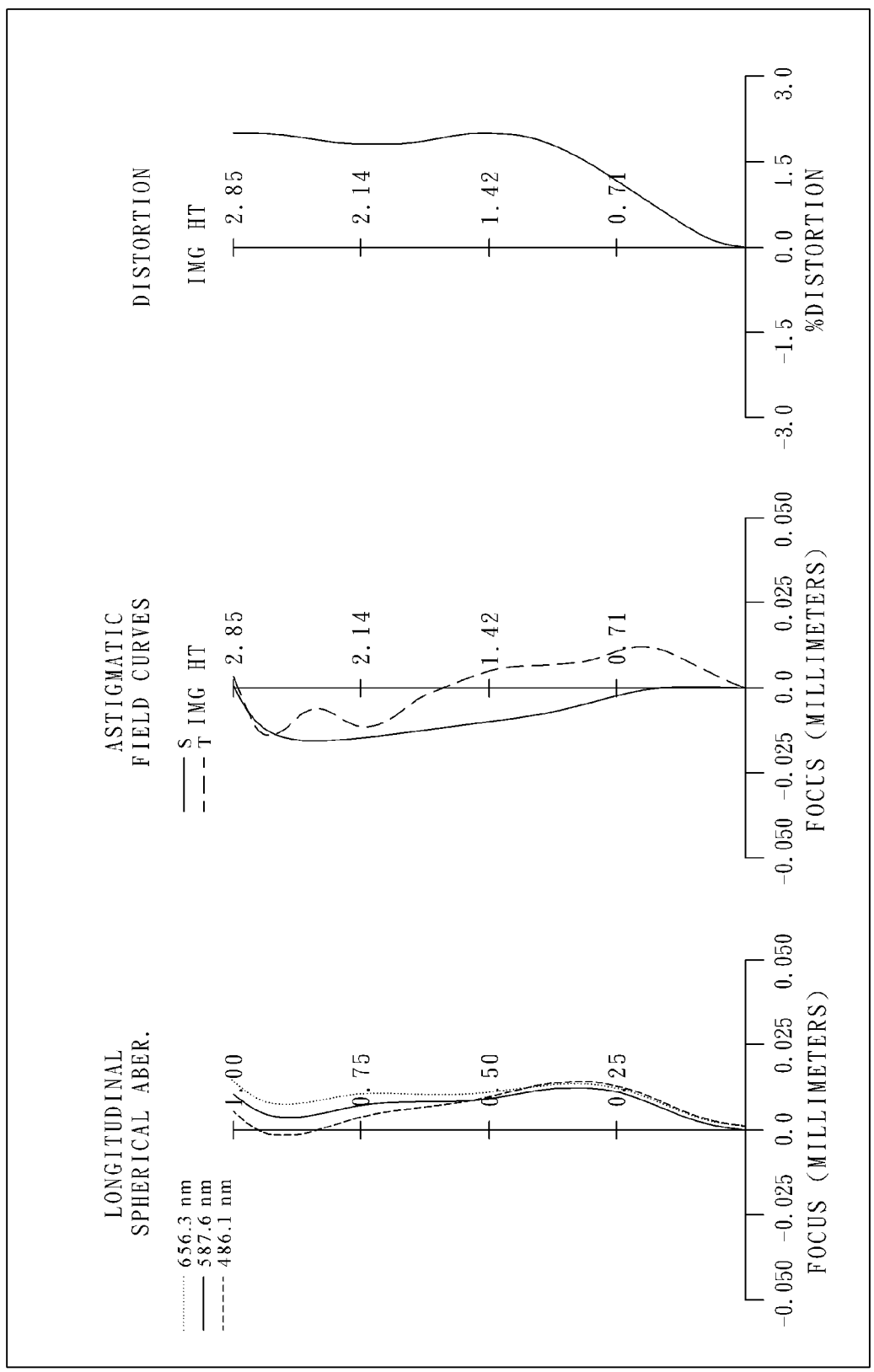
FIG. 8B shows the aberration curves of the eighth embodiment of the present invention.

FIG. 8A shows an optical image lens system in accordance with the eighth embodiment of the present invention, and FIG. 8B shows the aberration curves of the eighth embodiment of the present invention. The optical image lens system of the eighth embodiment of the present invention mainly comprises six lens elements with refractive power, in order from an object side to an image side:

a plastic first lens element 810 with positive refractive power having a convex object-side surface 811 and a convex image-side surface 812, the object-side and image-side surfaces 811 and 812 thereof being aspheric;

a plastic second lens element 820 with negative refractive power having a convex object-side surface 821 and a concave image-side surface 822, the object-side and image-side surfaces 821 and 822 thereof being aspheric;

a glass third lens element 830 with positive refractive power having a convex object-side surface 831 and a concave image-side surface 832, the object-side and image-side surfaces 831 and 832 thereof being aspheric;

a plastic fourth lens element 840 with negative refractive power having a concave object-side surface 841 and a convex image-side surface 842, the object-side and image-side surfaces 841 and 842 thereof being aspheric;

a plastic fifth lens element 850 with positive refractive power having a convex object-side surface 851 and a concave image-side surface 852, the object-side and image-side surfaces 851 and 852 thereof being aspheric, and the object-side surface 851 of the fifth lens element 850 is convex at the paraxial region, and the shape of the object-side surface 851 changes from convex at the paraxial region thereof to concave while away from the paraxial region thereof; and the image-side surface 852 of the fifth lens element 850 is concave at the paraxial region, and the shape of the image-side surface 852 changes from concave at the paraxial region thereof to convex while away from the paraxial region thereof; and a plastic sixth lens element 860 with negative refractive power having a convex object-side surface 861 and a concave image-side surface 862, the object-side and image-side surfaces 861 and 862 thereof being aspheric, and the image-side surface 862 of the sixth lens element 860 is concave at the paraxial region, and the shape of the image-side surface 862 changes from concave at the paraxial region thereof to convex while away from the paraxial region thereof;

wherein an aperture stop 800 is disposed between the first lens element 810 and the second lens element 820;

the optical image lens system further comprises an IR filter 870 disposed between the image-side surface 862 of the sixth lens element 860 and an image plane 880, and the IR filter 870 is made of glass and has no influence on the focal length of the optical image lens system; the optical image lens system further comprises an image sensor 890 provided on the image plane 880.

The detailed optical data of the eighth embodiment is shown in TABLE 21, and the aspheric surface data is shown in TABLE 22, wherein the units of the curvature radius, the thickness and the focal length are expressed in mm, and HFOV is defined as half of the maximal field of view.

TABLE 21

(Embodiment 8)
f = 3.53 mm, Fno = 2.10, HFOV = 38.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.323 | ASP | 0.465 | Plastic | 1.544 | 55.9 | 3.91 |
| 2 | | −23.866 | ASP | 0.021 | | | | |
| 3 | Ape. Stop | Plano | | 0.077 | | | | |
| 4 | Lens 2 | 2.222 | ASP | 0.240 | Plastic | 1.640 | 23.3 | −6.93 |
| 5 | | 1.418 | ASP | 0.339 | | | | |
| 6 | Lens 3 | 10.222 | ASP | 0.654 | Glass | 1.566 | 61.1 | 4.98 |
| 7 | | −3.797 | ASP | 0.205 | | | | |
| 8 | Lens 4 | −0.996 | ASP | 0.250 | Plastic | 1.640 | 23.3 | −5.02 |
| 9 | | −1.584 | ASP | 0.050 | | | | |
| 10 | Lens 5 | 1.341 | ASP | 0.280 | Plastic | 1.535 | 56.3 | 3.94 |
| 11 | | 3.424 | ASP | 0.700 | | | | |
| 12 | Lens 6 | 2.392 | ASP | 0.370 | Plastic | 1.535 | 56.3 | −5.73 |
| 13 | | 1.270 | ASP | 0.492 | | | | |
| 14 | IR-filter | Plano | | 0.300 | Glass | 1.517 | 64.2 | — |
| 15 | | Plano | | 0.258 | | | | |
| 16 | Image | Plano | | — | | | | |

Note:
Reference Wavelength is 587.6 nm (d-line)

TABLE 22

Aspheric Coefficients

| Surface # | 1 | 2 | 4 | 5 | 6 | 7 |
|---|---|---|---|---|---|---|
| k = | −6.6918E−01 | −1.0000E+00 | −2.4560E+01 | −7.5025E+00 | −2.2155E+01 | −3.4383E+00 |
| A4 = | 1.7526E−03 | −8.0148E−02 | −3.9590E−02 | 4.7711E−03 | −6.7126E−02 | −9.7780E−02 |
| A6 = | 2.2059E−02 | 3.0288E−01 | 9.3316E−02 | 1.9018E−02 | 1.6918E−02 | −4.9969E−02 |
| A8 = | −6.1935E−02 | −5.0425E−01 | −8.8016E−02 | −2.5408E−03 | −1.9985E−02 | 1.5671E−02 |
| A10 = | 8.3146E−02 | 4.1289E−01 | −4.8394E−02 | −5.9012E−02 | −7.0183E−02 | 7.4047E−02 |
| A12 = | −4.7234E−02 | −1.5306E−01 | 3.8308E−02 | 1.3804E−02 | 6.2874E−02 | −7.1630E−02 |
| A14 = |  |  |  | 2.5331E−02 | 4.3731E−03 | 1.7105E−02 |

| Surface # | 8 | 9 | 10 | 11 | 12 | 13 |
|---|---|---|---|---|---|---|
| k = | −4.8540E+00 | −5.7018E−01 | −8.1733E+00 | 6.0700E−01 | −1.8886E+01 | −4.1239E+00 |
| A4 = | −1.0439E−01 | −5.3481E−02 | 7.8826E−02 | 1.7557E−01 | −1.9002E−01 | −1.8222E−01 |
| A6 = | −2.3887E−01 | −2.1658E−02 | −1.9025E−01 | −3.8131E−01 | 3.5324E−02 | 9.7623E−02 |
| A8 = | 7.5574E−01 | 2.6535E−01 | 9.2275E−02 | 3.0878E−01 | 1.8523E−02 | −4.2574E−02 |
| A10 = | −6.5798E−01 | −2.2883E−01 | −3.0406E−02 | −1.7157E−01 | −1.0336E−02 | 1.2934E−02 |
| A12 = | 2.6620E−01 | 8.9620E−02 | −9.2850E−04 | 6.0698E−02 | 2.2036E−03 | −2.4524E−03 |
| A14 = | −4.5607E−02 | −1.3733E−02 | 2.3757E−03 | −1.1501E−02 | −2.3069E−04 | 2.5592E−04 |
| A16 = |  |  |  | 8.6055E−04 | 9.7129E−06 | −1.1161E−05 |

The equation of the aspheric surface profiles of the eighth embodiment has the same form as that of the first embodiment. Moreover, the definitions of the parameters of the relations are the same as those set forth in the first embodiment, but the value of the relations of the eighth embodiment are listed in TABLE 23:

TABLE 23

(Embodiment 8)

| f [mm] | 3.53 | f/f2 | −0.51 |
|---|---|---|---|
| Fno | 2.10 | f/f4 | −0.70 |
| HFOV [deg.] | 38.3 | f3/f1 | 1.27 |
| V4/V5 | 0.41 | f5/f3 | 0.79 |
| CT4/CT3 | 0.38 | FOV [deg.] | 76.6 |
| (R9 + R10)/(R9 − R10) | −2.29 | SAG51/CT5 | −0.36 |

Embodiment 9

Figure 9A:
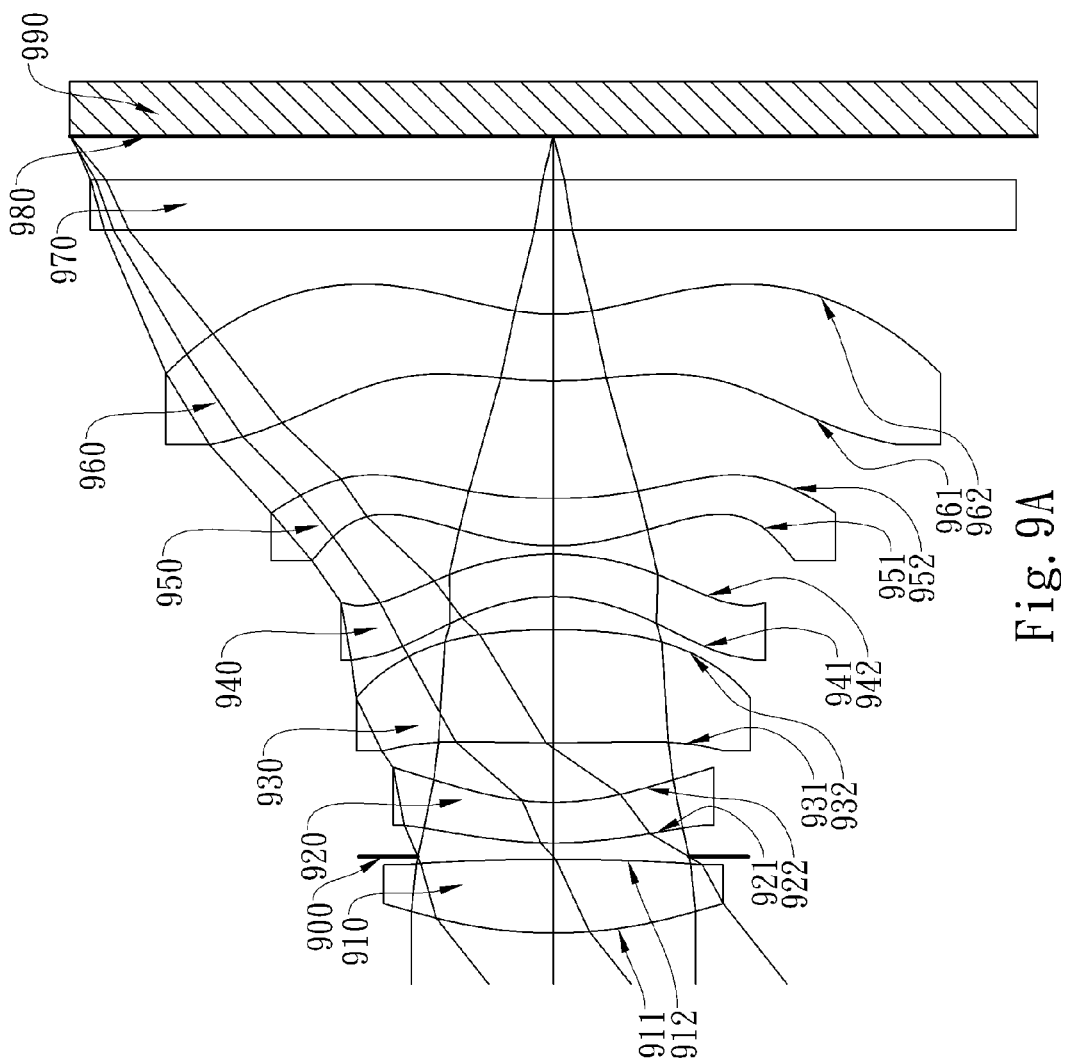
FIG. 9A shows an optical image lens system in accordance with the ninth embodiment of the present invention.
Figure 9B:
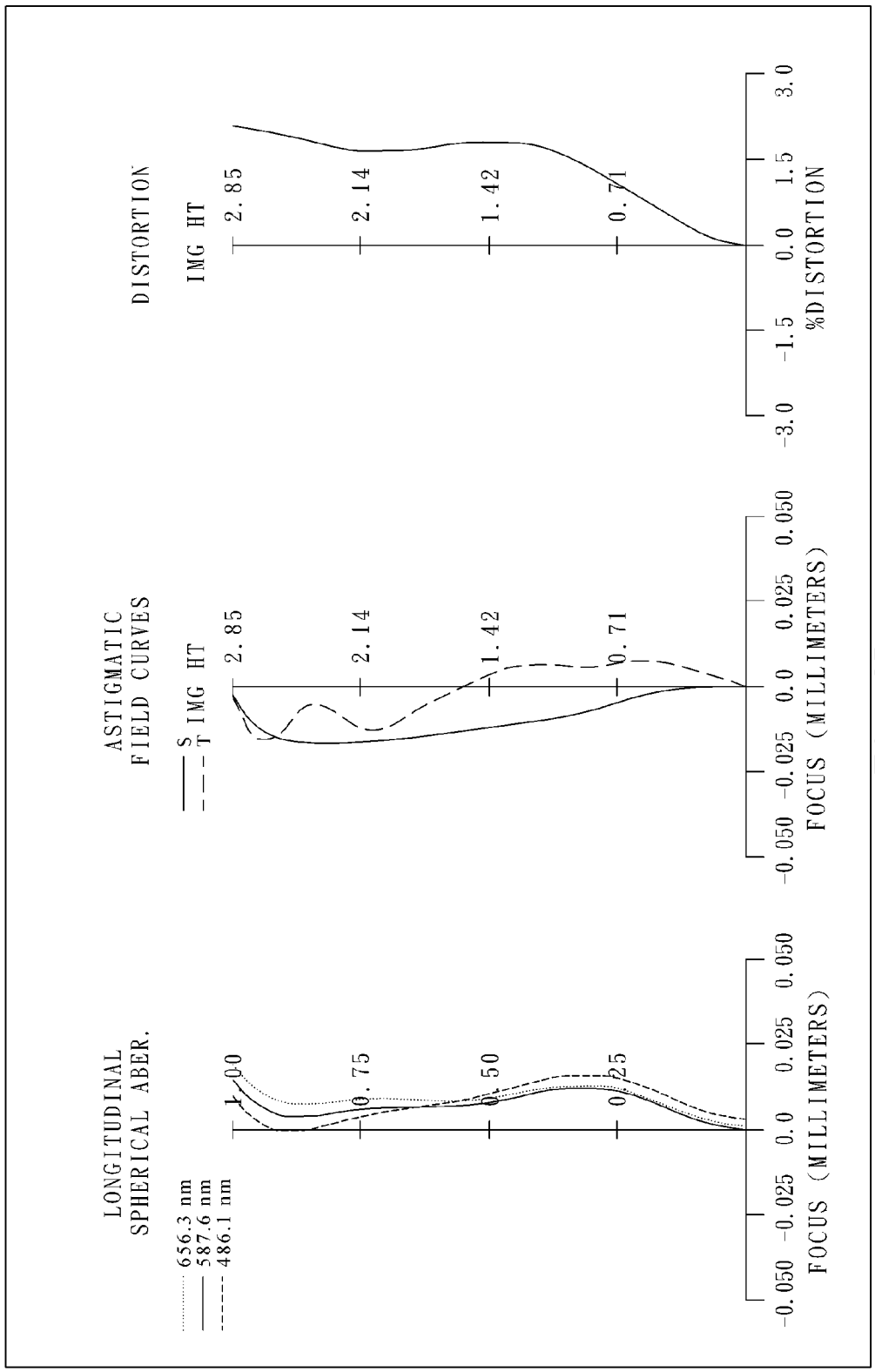
FIG. 9B shows the aberration curves of the ninth embodiment of the present invention.

FIG. 9A shows an optical image lens system in accordance with the ninth embodiment of the present invention, and FIG. 9B shows the aberration curves of the ninth embodiment of the present invention. The optical image lens system of the ninth embodiment of the present invention mainly comprises six lens elements with refractive power, in order from an object side to an image side:

a glass first lens element 910 with positive refractive power having a convex object-side surface 911 and a convex image-side surface 912, the object-side and image-side surfaces 911 and 912 thereof being aspheric;

a plastic second lens element 920 with negative refractive power having a convex object-side surface 921 and a concave image-side surface 922, the object-side and image-side surfaces 921 and 922 thereof being aspheric;

a glass third lens element 930 with positive refractive power having a convex object-side surface 931 and a convex image-side surface 932, the object-side and image-side surfaces 931 and 932 thereof being aspheric;

a plastic fourth lens element 940 with negative refractive power having a concave object-side surface 941 and a convex image-side surface 942, the object-side and image-side surfaces 941 and 942 thereof being aspheric;

a plastic fifth lens element 950 with positive refractive power having a convex object-side surface 951 and a concave image-side surface 952, the object-side and image-side surfaces 951 and 952 thereof being aspheric, and the object-side surface 951 of the fifth lens element 950 is convex at the paraxial region, and the shape of the object-side surface 951 changes from convex at the paraxial region thereof to concave while away from the paraxial region thereof; and the image-side surface 952 of the fifth lens element 950 is concave at the paraxial region, and the shape of the image-side surface 952 changes from concave at the paraxial region thereof to convex while away from the paraxial region thereof; and a plastic sixth lens element 960 with negative refractive power having a convex object-side surface 961 and a concave image-side surface 962, the object-side and image-side surfaces 961 and 962 thereof being aspheric, and the image-side surface 962 of the sixth lens element 960 is concave at the paraxial region, and the shape of the image-side surface 962 changes from concave at the paraxial region thereof to convex while away from the paraxial region thereof;

wherein an aperture stop 900 is disposed between the first lens element 910 and the second lens element 920;

the optical image lens system further comprises an IR filter 970 disposed between the image-side surface 962 of the sixth lens element 960 and an image plane 980, and the IR filter 970 is made of glass and has no influence on the focal length of the optical image lens system; the optical image lens system further comprises an image sensor 990 provided on the image plane 980.

The detailed optical data of the ninth embodiment is shown in TABLE 24, and the aspheric surface data is shown in TABLE 25, wherein the units of the curvature radius, the thickness and the focal length are expressed in mm, and HFOV is defined as half of the maximal field of view.

TABLE 24

(Embodiment 9)
f = 3.52 mm, Fno = 2.10, HFOV = 38.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.657 | ASP | 0.434 | Glass | 1.592 | 60.6 | 3.98 |
| 2 | | −19.570 | ASP | 0.015 | | | | |
| 3 | Ape. Stop | Plano | | 0.081 | | | | |
| 4 | Lens 2 | 2.155 | ASP | 0.240 | Plastic | 1.640 | 23.3 | −7.77 |
| 5 | | 1.438 | ASP | 0.351 | | | | |
| 6 | Lens 3 | 11.949 | ASP | 0.668 | Glass | 1.566 | 61.1 | 5.19 |
| 7 | | −3.817 | ASP | 0.195 | | | | |
| 8 | Lens 4 | −1.024 | ASP | 0.250 | Plastic | 1.640 | 23.3 | −4.96 |
| 9 | | −1.655 | ASP | 0.050 | | | | |
| 10 | Lens 5 | 1.346 | ASP | 0.280 | Plastic | 1.535 | 56.3 | 4.01 |
| 11 | | 3.361 | ASP | 0.693 | | | | |
| 12 | Lens 6 | 2.375 | ASP | 0.394 | Plastic | 1.535 | 56.3 | −6.04 |
| 13 | | 1.289 | ASP | 0.492 | | | | |
| 14 | IR-filter | Plano | | 0.300 | Glass | 1.517 | 64.2 | — |
| 15 | | Plano | | 0.258 | | | | |
| 16 | Image | Plano | | — | | | | |

Note:
Reference Wavelength is 587.6 nm (d-line)

TABLE 25

Aspheric Coefficients

| Surface # | 1 | 2 | 4 | 5 | 6 | 7 |
|---|---|---|---|---|---|---|
| k = | −1.5288E+00 | −1.0000E+00 | −2.2954E+01 | −7.5509E+00 | −2.5080E+01 | −1.6431E+00 |
| A4 = | −3.7526E−03 | −8.8895E−02 | −2.8275E−02 | 1.4519E−03 | −7.0653E−02 | −1.0256E−01 |
| A6 = | 2.1471E−02 | 2.9912E−01 | 9.1250E−02 | 1.5629E−02 | 1.3802E−02 | −5.1573E−02 |
| A8 = | −6.6530E−02 | −5.0034E−01 | −8.5593E−02 | −1.8326E−04 | −2.2664E−02 | 1.6578E−02 |
| A10 = | 7.6731E−02 | 4.0878E−01 | −2.9297E−02 | −5.7192E−02 | −7.3361E−02 | 7.4904E−02 |
| A12 = | −4.0661E−02 | −1.4705E−01 | 2.6074E−02 | 1.8944E−02 | 6.1224E−02 | −7.2255E−02 |
| A14 = | | | | 1.8880E−02 | 7.0387E−03 | 1.5974E−02 |

| Surface # | 8 | 9 | 10 | 11 | 12 | 13 |
|---|---|---|---|---|---|---|
| k = | −4.9197E+00 | −5.5515E−01 | −7.7670E+00 | 4.6589E−01 | −1.7757E+01 | −4.1047E+00 |
| A4 = | −1.0133E−01 | −5.3676E−02 | 7.8826E−02 | 1.7557E−01 | −1.9002E−01 | −1.8222E−01 |
| A6 = | −2.4251E−01 | −2.0419E−02 | −1.9025E−01 | −3.8131E−01 | 3.5324E−02 | 9.7623E−02 |
| A8 = | 7.5486E−01 | 2.6444E−01 | 9.2275E−02 | 3.0878E−01 | 1.8523E−02 | −4.2574E−02 |
| A10 = | −6.5803E−01 | −2.2948E−01 | −3.0406E−02 | −1.7157E−01 | −1.0336E−02 | 1.2934E−02 |
| A12 = | 2.6606E−01 | 8.9426E−02 | −9.2850E−04 | 6.0698E−02 | 2.2036E−03 | −2.4524E−03 |
| A14 = | −4.5800E−02 | −1.3568E−02 | 2.3757E−03 | −1.1501E−02 | −2.3069E−04 | 2.5592E−04 |
| A16 = | | | | 8.6055E−04 | 9.7129E−06 | −1.1161E−05 |

The equation of the aspheric surface profiles of the ninth embodiment has the same form as that of the first embodiment. Moreover, the definitions of the parameters of the relations are the same as those set forth in the first embodiment, but the value of the relations of the ninth embodiment are listed in the following TABLE 26:

TABLE 26

(Embodiment 9)

| f [mm] | 3.52 | f/f2 | −0.45 |
|---|---|---|---|
| Fno | 2.10 | f/f4 | −0.71 |
| HFOV [deg.] | 38.4 | f3/f1 | 1.30 |
| V4/V5 | 0.41 | f5/f3 | 0.77 |
| CT4/CT3 | 0.37 | FOV [deg.] | 76.8 |
| (R9 + R10)/(R9 − R10) | −2.34 | SAG51/CT5 | −0.31 |

Embodiment 10

Figure 10A:
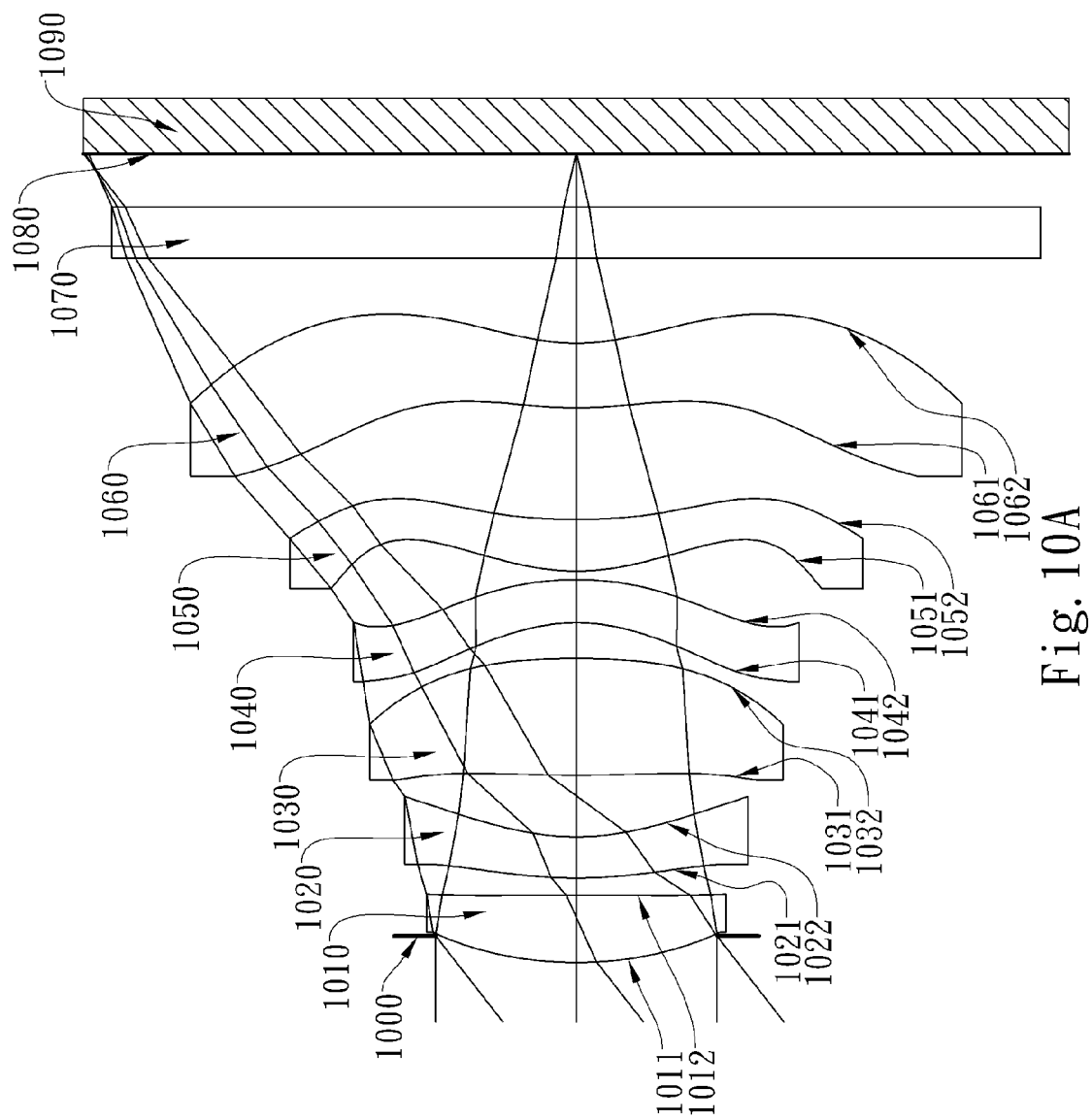
FIG. 10A shows an optical image lens system in accordance with the tenth embodiment of the present invention.
Figure 10B:
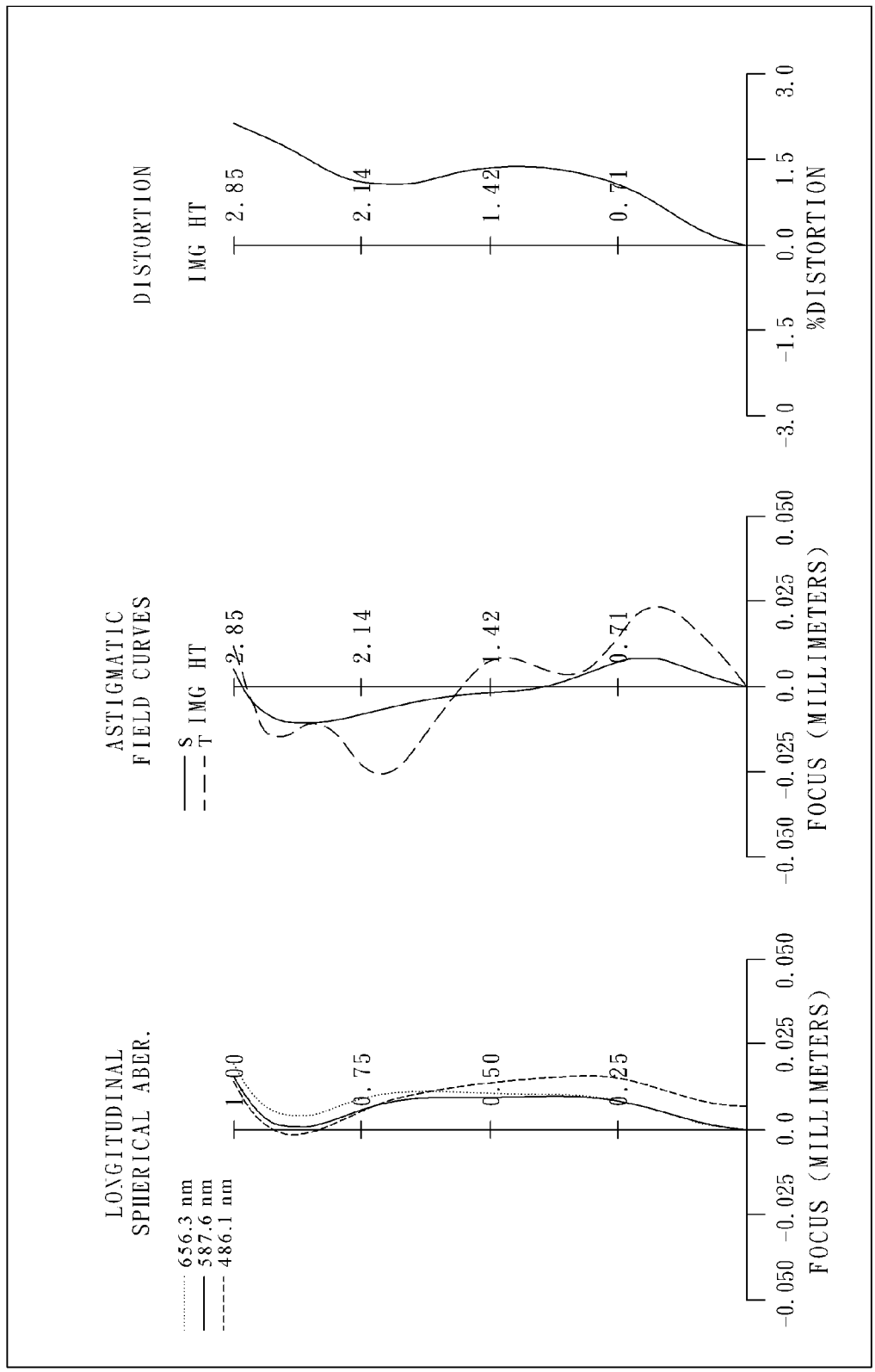
FIG. 10B shows the aberration curves of the tenth embodiment of the present invention.

FIG. 10A shows an optical image lens system in accordance with the tenth embodiment of the present invention, and FIG. 10B shows the aberration curves of the tenth embodiment of the present invention. The optical image lens system of the tenth embodiment of the present invention mainly comprises six lens elements with refractive power, in order from an object side to an image side:

a glass first lens element 1010 with positive refractive power having a convex object-side surface 1011 and a convex image-side surface 1012, the object-side and image-side surfaces 1011 and 1012 thereof being aspheric;

a plastic second lens element 1020 with negative refractive power having a convex object-side surface 1021 and a concave image-side surface 1022, the object-side and image-side surfaces 1021 and 1022 thereof being aspheric;

a glass third lens element 1030 with positive refractive power having a convex object-side surface 1031 and a convex image-side surface 1032, the object-side and image-side surfaces 1031 and 1032 thereof being aspheric;

a plastic fourth lens element 1040 with negative refractive power having a concave object-side surface 1041 and a convex image-side surface 1042, the object-side and image-side surfaces 1041 and 1042 thereof being aspheric;

a plastic fifth lens element 1050 with positive refractive power having a convex object-side surface 1051 and a concave image-side surface 1052, the object-side and image-side surfaces 1051 and 1052 thereof being aspheric, and the object-side surface 1051 of the fifth lens element 1050 is convex at the paraxial region, and the shape of the object-side surface 1051 changes from convex at the paraxial region thereof to concave while away from the paraxial region thereof; and the image-side surface 1052 of the fifth lens element 1050 is concave at the paraxial region, and the shape of the image-side surface 1052 changes from concave at the paraxial region thereof to convex while away from the paraxial region thereof; and a plastic sixth lens element 1060 with negative refractive power having a convex object-side surface 1061 and a concave image-side surface 1062, the object-side and image-side surfaces 1061 and 1062 thereof being aspheric, and the image-side surface 1062 of the sixth lens element 1060 is concave at the paraxial region, and the shape of the image-side surface 1062 changes from concave at the paraxial region thereof to convex while away from the paraxial region thereof;

wherein an aperture stop 1000 is disposed between an object and the first lens element 1010;

the optical image lens system further comprises an IR filter 1070 disposed between the image-side surface 1062 of the sixth lens element 1060 and an image plane 1080, and the IR filter 1070 is made of glass and has no influence on the focal length of the optical image lens system; the optical image lens system further comprises an image sensor 1090 provided on the image plane 1080.

The detailed optical data of the tenth embodiment is shown in TABLE 27, and the aspheric surface data is shown in TABLE 28, wherein the units of the curvature radius, the thickness and the focal length are expressed in mm, and HFOV is defined as half of the maximal field of view.

TABLE 27

(Embodiment 10)
f = 3.59 mm, Fno = 2.20, HFOV = 37.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.154 | | | | |
| 2 | Lens 1 | 2.162 | ASP | 0.390 | Glass | 1.566 | 61.1 | 3.74 |
| 3 | | −95.465 | ASP | 0.100 | | | | |
| 4 | Lens 2 | 2.374 | ASP | 0.240 | Plastic | 1.607 | 26.6 | −6.24 |
| 5 | | 1.404 | ASP | 0.358 | | | | |
| 6 | Lens 3 | 9.205 | ASP | 0.679 | Glass | 1.592 | 60.6 | 5.13 |
| 7 | | −4.399 | ASP | 0.208 | | | | |
| 8 | Lens 4 | −1.036 | ASP | 0.250 | Plastic | 1.640 | 23.3 | −4.33 |
| 9 | | −1.812 | ASP | 0.050 | | | | |
| 10 | Lens 5 | 1.266 | ASP | 0.300 | Plastic | 1.535 | 56.3 | 3.43 |
| 11 | | 3.759 | ASP | 0.650 | | | | |
| 12 | Lens 6 | 2.422 | ASP | 0.375 | Plastic | 1.535 | 56.3 | −5.44 |
| 13 | | 1.250 | ASP | 0.492 | | | | |
| 14 | IR-filter | Plano | | 0.300 | Glass | 1.517 | 64.2 | — |
| 15 | | Plano | | 0.307 | | | | |
| 16 | Image | Plano | | — | | | | |

Note:
Reference Wavelength is 587.6 nm (d-line)

TABLE 28

| Aspheric Coefficients | | | | | | |
|---|---|---|---|---|---|---|
| Surface # | 2 | 3 | 4 | 5 | 6 | 7 |
| k = | −1.6819E−01 | −1.0000E+00 | −3.0000E+01 | −8.1963E+00 | −1.7237E+01 | −1.7725E+01 |
| A4 = | 1.0743E−02 | −4.8280E−02 | −2.1656E−02 | 4.6120E−02 | −7.0088E−02 | −1.0452E−01 |
| A6 = | 6.3634E−03 | 2.6828E−01 | 5.2325E−02 | −3.8797E−02 | 1.5342E−02 | −8.6549E−02 |
| A8 = | 2.6209E−02 | −4.5132E−01 | −7.4965E−02 | 1.8738E−02 | −2.1693E−02 | 4.1746E−02 |
| A10 = | −3.9615E−02 | 3.5558E−01 | −5.7995E−02 | −4.0106E−02 | −4.4391E−02 | 8.0877E−02 |
| A12 = | 2.2328E−02 | −1.0783E−01 | 5.6431E−02 | 6.4676E−03 | 5.2100E−02 | −8.0933E−02 |
| A14 = | | | | 1.8672E−02 | −4.2578E−03 | 2.0594E−02 |

| Surface # | 8 | 9 | 10 | 11 | 12 | 13 |
|---|---|---|---|---|---|---|
| k = | −5.8330E+00 | −6.4810E−01 | −8.8408E+00 | 1.6082E+00 | −2.2142E+01 | −4.6401E+00 |
| A4 = | −5.7837E−02 | −6.6907E−02 | 7.8826E−02 | 1.7557E−01 | −1.9002E−01 | −1.8222E−01 |
| A6 = | −2.8197E−01 | 2.0149E−02 | −1.9025E−01 | −3.8131E−01 | 3.5324E−02 | 9.7623E−02 |
| A8 = | 7.5018E−01 | 2.3062E−01 | 9.2275E−02 | 3.0878E−01 | 1.8523E−02 | −4.2574E−02 |
| A10 = | −6.4928E−01 | −2.3437E−01 | −3.0406E−02 | −1.7157E−01 | −1.0336E−02 | 1.2934E−02 |
| A12 = | 2.6720E−01 | 9.9447E−02 | −9.2850E−04 | 6.0698E−02 | 2.2036E−03 | −2.4524E−03 |
| A14 = | −4.6054E−02 | −1.5996E−02 | 2.3757E−03 | −1.1501E−02 | −2.3069E−04 | 2.5592E−04 |
| A16 = | | | | 8.6055E−04 | 9.7129E−06 | −1.1161E−05 |

The equation of the aspheric surface profiles of the tenth embodiment has the same form as that of the first embodiment. Moreover, the description of the factors in the relations is as those set forth in the first embodiment, but the values of the relations of the tenth embodiment are listed in TABLE 29.

TABLE 29

(Embodiment 10)

| f [mm] | 3.59 | f/f2 | −0.58 |
|---|---|---|---|
| Fno | 2.20 | f/f4 | −0.83 |
| HFOV [deg.] | 37.8 | f3/f1 | 1.37 |
| V4/V5 | 0.41 | f5/f3 | 0.67 |
| CT4/CT3 | 0.37 | FOV [deg.] | 75.6 |
| (R9 + R10)/(R9 − R10) | −2.02 | SAG51/CT5 | −0.34 |

It is to be noted that TABLES 1-29 show different data of the different embodiments; however, the data of the different embodiments are obtained from experiments. Therefore, any optical image lens system of the same structure is considered to be within the scope of the present invention even if it uses different data. The embodiments depicted above and the appended drawings are exemplary and are not intended to limit the scope of the present invention.

What is claimed is:

1. An optical image lens system comprising, in order from an object side to an image side:
   a first lens element with positive refractive power having a convex object-side surface;
   a second lens element;
   a third lens element with positive refractive power;
   a fourth lens element;
   a fifth lens element with positive refractive power having a convex object-side surface and a concave image-side surface, at least one of an object-side surface and the image-side surface thereof being aspheric, and the fifth lens element is made of plastic; and
   a sixth lens element with negative refractive power having a concave image-side surface, at least one of an object-side surface and the image-side surface thereof being aspheric, the sixth lens element is made of plastic, and the shape of the image-side surface changes from concave at the paraxial region thereof to convex while away from the paraxial region thereof;
   wherein a focal length of the third lens element is f3, a focal length of the first lens element is f1, a focal length of the fifth lens element is f5, and they satisfy the following relations:

$0 < f3/f1 < 2.5$; and $0 < f5/f3 < 4.0$.

2. The optical image lens system according to claim 1, wherein the fourth lens element has negative refractive power.

3. The optical image lens system according to claim 2, wherein a curvature radius of the object-side surface of the fifth lens element is R9, a curvature radius of the image-side surface of the fifth lens element is R10, and they satisfy the following relation:

$-5.0 < (R9+R10)/(R9-R10) < -1.3$.

4. The optical image lens system according to claim 2, wherein the fourth lens element has a concave object-side surface and a convex image-side surface.

5. The optical image lens system according to claim 2, wherein a focal length of the optical image lens system is f, a focal length of the fourth lens element is f4, and they satisfy the following relation:

$-1.5 < f/f4 < -0.5$.

6. The optical image lens system according to claim 2, wherein a central thickness of the fourth lens element on the optical axis is CT4, a central thickness of the third lens element on the optical axis is CT3, and they satisfy the following relation:

$0 < CT4/CT3 < 1.2$.

7. The optical image lens system according to claim 2, wherein an Abbe number of the fourth lens element is V4, an Abbe number of the fifth lens element is V5, and they satisfy the following relation:

$0.2 < V4/V5 < 0.6$.

8. The optical image lens system according to claim 4, wherein a focal length of the optical image lens system is f, a focal length of the second lens element is f2, and they satisfy the following relation:

$-0.7 < f/f2 < 0$.

9. The optical image lens system according to claim 4, wherein the maximal field of view of the optical image lens system is FOV, and it satisfies the following relation:

70 degrees < FOV < 100 degrees.

10. The optical image lens system according to claim 1, wherein the focal length of the fifth lens element is f5, the focal length of the third lens element is f3, and they satisfy the following relation:

$0.4 < f5/f3 < 1.6$.

11. The optical image lens system according to claim 1, wherein the focal length of the third lens element is f3, the focal length of the first lens element is f1, and they satisfy the following relation:

$0.3 < f3/f1 < 1.6$.

12. The optical image lens system according to claim 1, wherein an axial distance between the fifth lens element and the sixth lens element is T56, and T56 is the largest axial distance among any two adjacent lens elements with refractive power.

13. The optical image lens system according to claim 1, wherein the shape of the object-side surface on the fifth lens element changes from convex at the paraxial region thereof to concave while away from the paraxial region thereof; and the shape of the image-side surface on the fifth lens element changes from concave at the paraxial region thereof to convex while away from the paraxial region thereof.

14. The optical image lens system according to claim 1, wherein a distance in parallel with the optical axis from a maximum effective diameter position on the object-side surface of the fifth lens element to an on-axis vertex on the object-side surface of the fifth lens element is SAG51, the central thickness of the fifth lens element is CT5, and they satisfy the following relation:

$-1.0 < SAG51/CT5 < 0$.

15. An optical image lens system comprising, in order from an object side to an image side:
    a first lens element with positive refractive power having a convex object-side surface;
    a second lens element;
    a third lens element with positive refractive power;
    a fourth lens element having a concave object-side surface and a convex image-side surface;
    a fifth lens element with positive refractive power having a convex object-side surface and a concave image-side surface, at least one of an object-side surface and the image-side surface thereof being aspheric, and the fifth lens element is made of plastic; and a sixth lens element with negative refractive power having a concave image-side surface, at least one of an object-side surface and the image-side surface thereof being aspheric, the sixth lens element is made of plastic, and the shape of the image-side surface changes from concave at the paraxial region thereof to convex while away from the paraxial region thereof;

wherein a focal length of the third lens element is f3, a focal length of the first lens element is f1, and they satisfy the following relation:

$0<f3/f1<2.5.$

16. The optical image lens system according to claim 15, wherein a curvature radius of the object-side surface of the fifth lens element is R9, a curvature radius of the image-side surface of the fifth lens element is R10, and they satisfy the following relation:

$-5.0<(R9+R10)/(R9-R10)<-1.3.$

17. The optical image lens system according to claim 16, wherein the fourth lens element has negative refractive power.

18. The optical image lens system according to claim 16, wherein an Abbe number of the fourth lens element is V4, an Abbe number of the fifth lens element is V5, and they satisfy the following relation:

$0.2<V4/V5<0.6.$

19. The optical image lens system according to claim 16, wherein a focal length of the fifth lens element is f5, the focal length of the third lens element is f3, and they satisfy the following relation:

$0<f5/f3<4.0.$

20. The optical image lens system according to claim 16, wherein a central thickness of the fourth lens element on the optical axis is CT4, a central thickness of the third lens element on the optical axis is CT3, and they satisfy the following relation:

$0<CT4/CT3<1.2.$

21. The optical image lens system according to claim 15, wherein a focal length of the optical image lens system is f, a focal length of the fourth lens element is f4, and they satisfy the following relation:

$-1.5<f/f4<-0.5.$

22. The optical image lens system according to claim 15, wherein the focal length of the third lens element is f3, the focal length of the first lens element is f1, and they satisfy the following relation:

$0.3<f3/f1<1.6.$

23. The optical image lens system according to claim 15, wherein the shape of the object-side surface on the fifth lens element changes from convex at the paraxial region thereof to concave while away from the paraxial region thereof; and the shape of the image-side surface on the fifth lens element changes from concave at the paraxial region thereof to convex while away from the paraxial region thereof.

24. The optical image lens system according to claim 15, wherein a distance in parallel with the optical axis from a maximum effective diameter position on the object-side surface of the fifth lens element to an on-axis vertex on the object-side surface of the fifth lens element is SAG51, the central thickness of the fifth lens element is CT5, and they satisfy the following relation:

$-1.0<SAG51/CT5<0.$

25. An optical image lens system comprising, in order from an object side to an image side:

a first lens element with positive refractive power having a convex object-side surface;

a second lens element;

a third lens element with positive refractive power;

a fourth lens element;

a fifth lens element with positive refractive power having a convex object-side surface and a concave image-side surface, at least one of an object-side surface and the image-side surface thereof being aspheric, and the fifth lens element is made of plastic; and a sixth lens element with negative refractive power having a concave image-side surface, at least one of an object-side surface and the image-side surface thereof being aspheric, the sixth lens element is made of plastic, and the shape of the image-side surface changes from concave at the paraxial region thereof to convex while away from the paraxial region thereof;

wherein a focal length of the fifth lens element is f5, a focal length of the third lens element is f3, a focal length of the optical image lens system is f, a focal length of the fourth lens element is f4, and they satisfy the following relations:

$0<f5/f3<4.0;$ and $-1.5<f/f4<-0.5.$

26. The optical image lens system according to claim 25, wherein the fourth lens element has a concave object-side surface and a convex image-side surface.

27. The optical image lens system according to claim 26, wherein the focal length of the third lens element is f3, a focal length of the first lens element is f1, and they satisfy the following relation:

$0<f3/f1<2.5.$

28. The optical image lens system according to claim 26, wherein an Abbe number of the fourth lens element is V4, an Abbe number of the fifth lens element is V5, and they satisfy the following relation:

$0.2<V4/V5<0.6.$

29. The optical image lens system according to claim 26, wherein a central thickness of the fourth lens element on the optical axis is CT4, a central thickness of the third lens element on the optical axis is CT3, and they satisfy the following relation:

$0<CT4/CT3<1.2.$

30. The optical image lens system according to claim 25, wherein the focal length of the fifth lens element is f5, the focal length of the third lens element is f3, and they satisfy the following relation:

$0.4<f5/f3<1.6.$

31. The optical image lens system according to claim 25, wherein the shape of the object-side surface on the fifth lens element changes from convex at the paraxial region thereof to concave while away from the paraxial region thereof; and the shape of the image-side surface on the fifth lens element changes from concave at the paraxial region thereof to convex while away from the paraxial region thereof.

* * * * *